US011118730B1

(12) United States Patent
Davidenko et al.

(10) Patent No.: US 11,118,730 B1
(45) Date of Patent: Sep. 14, 2021

(54) FAN MOUNTING APPARATUS

(71) Applicant: DELTA T, LLC, Lexington, KY (US)

(72) Inventors: Igor Davidenko, Lexington, KY (US); Michael Mulcahy, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 0 days.

(21) Appl. No.: 16/555,782

(22) Filed: Aug. 29, 2019

Related U.S. Application Data

(60) Provisional application No. 62/724,351, filed on Aug. 29, 2018.

(51) Int. Cl.
| | | |
|---|---|---|
| *B42F 13/00* | (2006.01) | |
| *F16M 13/02* | (2006.01) | |
| *F24F 13/32* | (2006.01) | |
| *F16C 11/06* | (2006.01) | |

(52) U.S. Cl.
CPC ......... *F16M 13/022* (2013.01); *F16C 11/069* (2013.01); *F16M 13/027* (2013.01); *F24F 13/32* (2013.01); *F24F 2221/14* (2013.01)

(58) Field of Classification Search
CPC ....... F04D 29/601; F04D 25/068; F21V 21/02
See application file for complete search history.

(56) References Cited

U.S. PATENT DOCUMENTS

| | | | |
|---|---|---|---|
| 3,124,330 A | 3/1964 | Robinson | |
| 4,064,427 A | 12/1977 | Hansen et al. | |
| 4,238,819 A * | 12/1980 | Harris | F21V 21/02 |
| | | | 362/235 |
| 4,560,321 A | 12/1985 | Kawai | |
| 5,085,392 A | 2/1992 | Perna | |
| 5,711,397 A | 1/1998 | Flora et al. | |
| 6,520,468 B2 * | 2/2003 | Lee | F04D 29/601 |
| | | | 248/343 |
| 6,619,919 B2 | 9/2003 | Kerr | |
| 6,709,238 B2 | 3/2004 | Marshall | |
| 6,881,037 B2 | 4/2005 | Marshall | |
| 7,510,160 B1 | 3/2009 | Wang | |
| 7,527,232 B2 * | 5/2009 | Frampton | F04D 25/088 |
| | | | 248/342 |
| 7,621,498 B2 | 11/2009 | Tang | |
| 7,625,186 B1 | 12/2009 | Lueddecke | |
| 8,353,675 B2 * | 1/2013 | Lin | F04D 29/601 |
| | | | 416/244 R |
| 8,480,041 B2 | 7/2013 | Myers | |

(Continued)

OTHER PUBLICATIONS

Office Action dated Feb. 20, 2020 for U.S. Appl. No. 16/178,807, filed Nov. 2, 2018.

*Primary Examiner* — Amy J. Sterling
(74) *Attorney, Agent, or Firm* — Dickinson Wright PLLC; Andrew D. Dorisio

(57) ABSTRACT

A fan mount includes a first part movable relative to a second part. A retainer is connected to the second part of the fan mount above the first part for restricting the movement of the fan relative to the fan mount. The first part may be a ball member having a depending portion with an hourglass shape. A safety connector may be provided, and a retainer connected to the second part of the fan mount for retaining the safety connector. A cover may also be provided for mounting to the second part, the cover including a central opening for receiving the support. A trim piece is adapted for telescoping within the opening of the cover.

17 Claims, 29 Drawing Sheets

(56) References Cited

U.S. PATENT DOCUMENTS

| | | |
|---|---|---|
| 8,931,747 B2 | 1/2015 | Davis |
| 9,976,587 B2 * | 5/2018 | Heimann .............. F16B 21/078 |
| 10,590,960 B2 * | 3/2020 | Beaman ................ F04D 25/068 |
| 2003/0213883 A1 * | 11/2003 | Fu-Liang .............. F04D 29/601 |
| | | 248/343 |
| 2004/0195479 A1 | 10/2004 | Gulley |
| 2005/0006549 A1 * | 1/2005 | Liu ....................... F04D 29/601 |
| | | 248/343 |
| 2005/0189456 A1 | 9/2005 | Hoffmann |
| 2006/0024127 A1 | 2/2006 | Heath |
| 2007/0090242 A1 | 4/2007 | Gulley |
| 2008/0107527 A1 | 5/2008 | Gajewski |
| 2008/0124224 A1 | 5/2008 | Tsai |
| 2009/0152426 A1 | 6/2009 | Longton et al. |
| 2009/0230274 A1 * | 9/2009 | Tang ....................... F04D 29/60 |
| | | 248/343 |

* cited by examiner

FAN MOUNTING APPARATUS

This application claims the benefit of U.S. Provisional Patent Application Ser. No. 62/724,351, the disclosure of which is incorporated herein by reference. This application also relates to U.S. patent application Ser. No. 16/178,807, the disclosure of which is incorporated herein by reference.

TECHNICAL FIELD

This disclosure relates generally to a mounting apparatus for a fan and, more particularly, to a mount that allows for controlled movement of the associated fan and certain other advantages.

BACKGROUND

A variety of fan systems have been made and used over the years in a variety of contexts. For instance, various ceiling fans are disclosed in U.S. Pat. No. 7,284,960, entitled "Fan Blades," issued Oct. 23, 2007; U.S. Pat. No. 6,244,821, entitled "Low Speed Cooling Fan," issued Jun. 12, 2001; U.S. Pat. No. 6,939,108, entitled "Cooling Fan with Reinforced Blade," issued Sep. 6, 2005; and U.S. Pat. No. D607,988, entitled "Ceiling Fan," issued Jan. 12, 2010. The disclosures of each of those U.S. patents are incorporated by reference herein. Additional exemplary fans are disclosed in U.S. Pat. Pub. No. 2008/0008596, entitled "Fan Blades," published Jan. 10, 2008; U.S. Pat. Pub. No. 2009/0208333, entitled "Ceiling Fan System with Brushless Motor," published Aug. 20, 2009; and U.S. Pat. Pub. No. 2010/0278637, entitled "Ceiling Fan with Variable Blade Pitch and Variable Speed Control," published Nov. 4, 2010, the disclosures of which are also incorporated by reference herein. It should be understood that teachings herein may be incorporated into any of the fans described in any of the above-referenced patents, publications, or patent applications. It should also be understood that a fan may include sensors or other features that are used to control, at least in part, operation of a fan system. For instance, such fan systems are disclosed in U.S. Pat. Pub. No. 2009/0097975, entitled "Ceiling Fan with Concentric Stationary Tube and Power-Down Features," published Apr. 16, 2009, the disclosure of which is incorporated by reference herein; U.S. Pat. Pub. No. 2009/0162197, entitled "Automatic Control System and Method to Minimize Oscillation in Ceiling Fans," published Jun. 25, 2009, the disclosure of which is incorporated by reference herein; U.S. Pat. Pub. No. 2010/0291858, entitled "Automatic Control System for Ceiling Fan Based on Temperature Differentials," published Nov. 18, 2010, the disclosure of which is incorporated by reference herein; and U.S. Provisional Patent App. No. 61/165,582, entitled "Fan with Impact Avoidance System Using Infrared," filed Apr. 1, 2009, the disclosure of which is incorporated by reference herein. Alternatively, any other suitable mounting systems/features may be used in conjunction with embodiments described herein.

In terms of mounting fans specifically, there are a wide range of mounting options available for various ceiling fans. Generally the mounts are for specific applications that the fans are needed for, ranging from high to low ceilings, flat to heavily sloped ceilings and indoor and outdoor environments. For example, mounting options may include short, standard and universal/sloped ceiling mounting options. Mounting systems also may have different power supply options. This creates a wide range of combinations of mounts and power supplies, which may burdens production, sourcing, and customer service.

In addition, it has become increasingly popular to mount fans in outdoor environments, in which the fan may be exposed to turbulent air conditions, such as high winds. Accordingly, there is a need for a robust ceiling fan mounting system that can withstand such environments, as may be in the case of outdoor fans mounted in or near coastal regions. In addition, a need is identified for a quick and easy ceiling fan mounting system that does not require multiple fasteners and cumbersome assembly.

Accordingly, the disclosure herein relates to a universal mounting system for ceiling fans to address these issues while also improving other aspects of ceiling mounts.

SUMMARY

According to a first aspect of the disclosure, an apparatus for mounting a fan is provided. The apparatus comprises a fan mount for supporting the fan, the fan mount comprising a first part movable relative to a second part. A retainer is connected to the second part of the fan mount above the first part for restricting movement of the fan relative to the fan mount.

In one embodiment, the first part comprises a partially spherical ball and the second part comprises a socket for at least partially receiving the partially spherical ball. The retainer is positioned in the fan mount for engaging an upper surface of the partially spherical ball. The socket may further comprise a plurality of radially extending projections for engaging the partially spherical ball. The retainer may include at least one projection for extending into a receiver of the partially spherical ball, and may additionally or alternatively include at least one projection for connecting with the second part of the fan mount. The at least one projection may be adapted to form a snap fit engagement with the second part.

The retainer may include at least one opening. A restrictor may be provided having a projection for passing through the at least one opening for engaging the first part of the fan mount. The restrictor may be adapted to form a releasable locking engagement with the retainer.

The apparatus may further include a cover adapted for connecting to the second part via a bayonet fitting. The apparatus may further include a dampener between the first part and the second part. The second part may further include a safety cable retainer, such as one having a labyrinth passage.

According to a further aspect of the disclosure, an apparatus for mounting a fan comprises a fan mount for supporting the fan. The fan mount comprises a ball member movable relative to a socket, the ball member having a depending portion having an hourglass shape. The depending portion may comprise a neck with a receiver for receiving a support for supporting the fan, the neck adapted to engage a lower portion of the fan mount adjacent to the socket. The ball member may be adapted to pivot up to about 40 degrees from plumb position.

Still a further aspect of the disclosure pertains to an apparatus for mounting a fan. The apparatus comprises a fan mount for supporting the fan, the fan mount comprising a first part movable relative to a second part. A safety connector is also provided, as is a retainer connected to the second part of the fan mount for retaining the safety connector. In some embodiments, a support for supporting the fan is provided, and the first part is adapted for receiving the support.

Yet a further aspect of the disclosure pertains to an apparatus for mounting a fan adapted for connecting to a support. The apparatus comprises a fan mount for supporting the fan, the fan mount comprising a first part movable relative to a second part, the first part adapted for connecting to the support. A cover is adapted for mounting to the second part, the cover including a central opening for receiving the support. A trim piece is adapted for telescoping within the central opening of the cover. In one embodiment, the first part comprises a ball member connected to a receiver for receiving the support, the trim piece being adapted for allowing the ball member to pivot when the receiver is positioned within the support.

BRIEF DESCRIPTION OF THE DRAWING FIGURES

Figure 4:
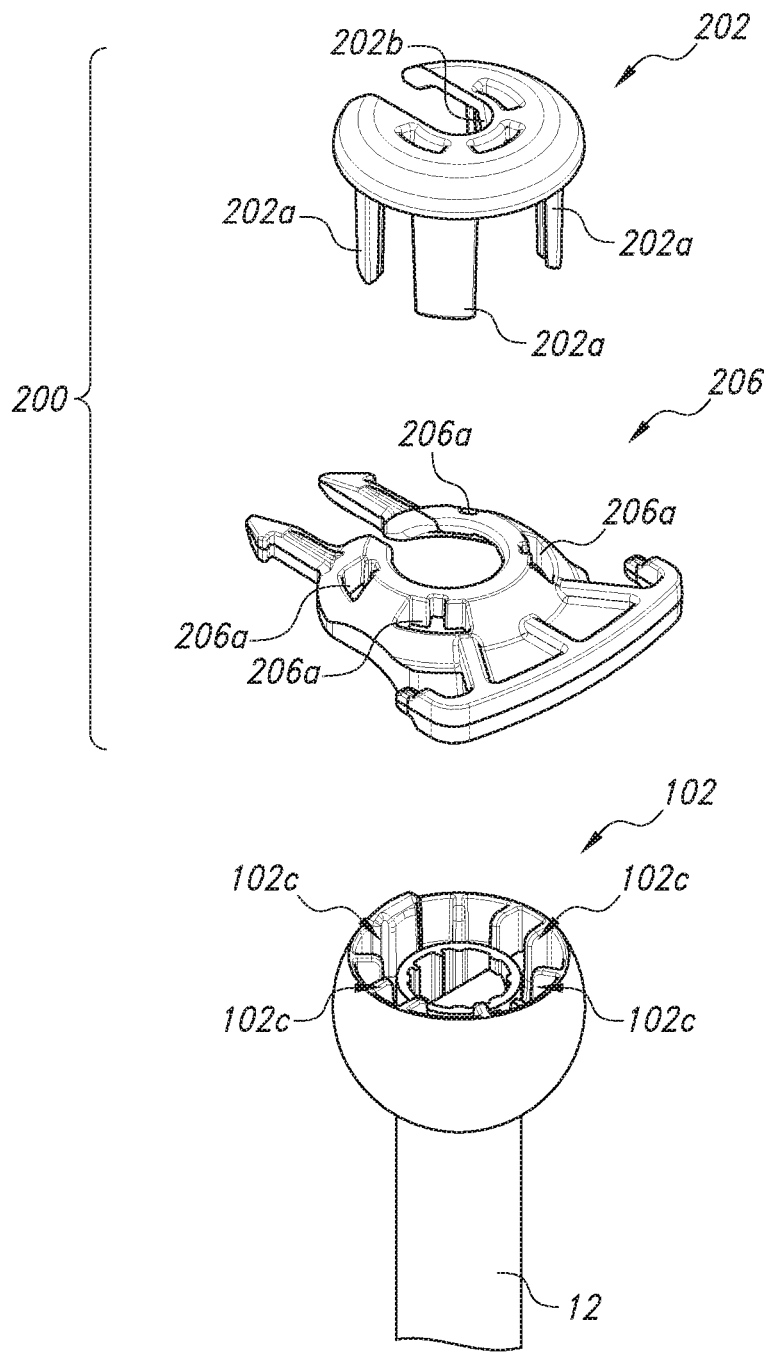
Figure 5:
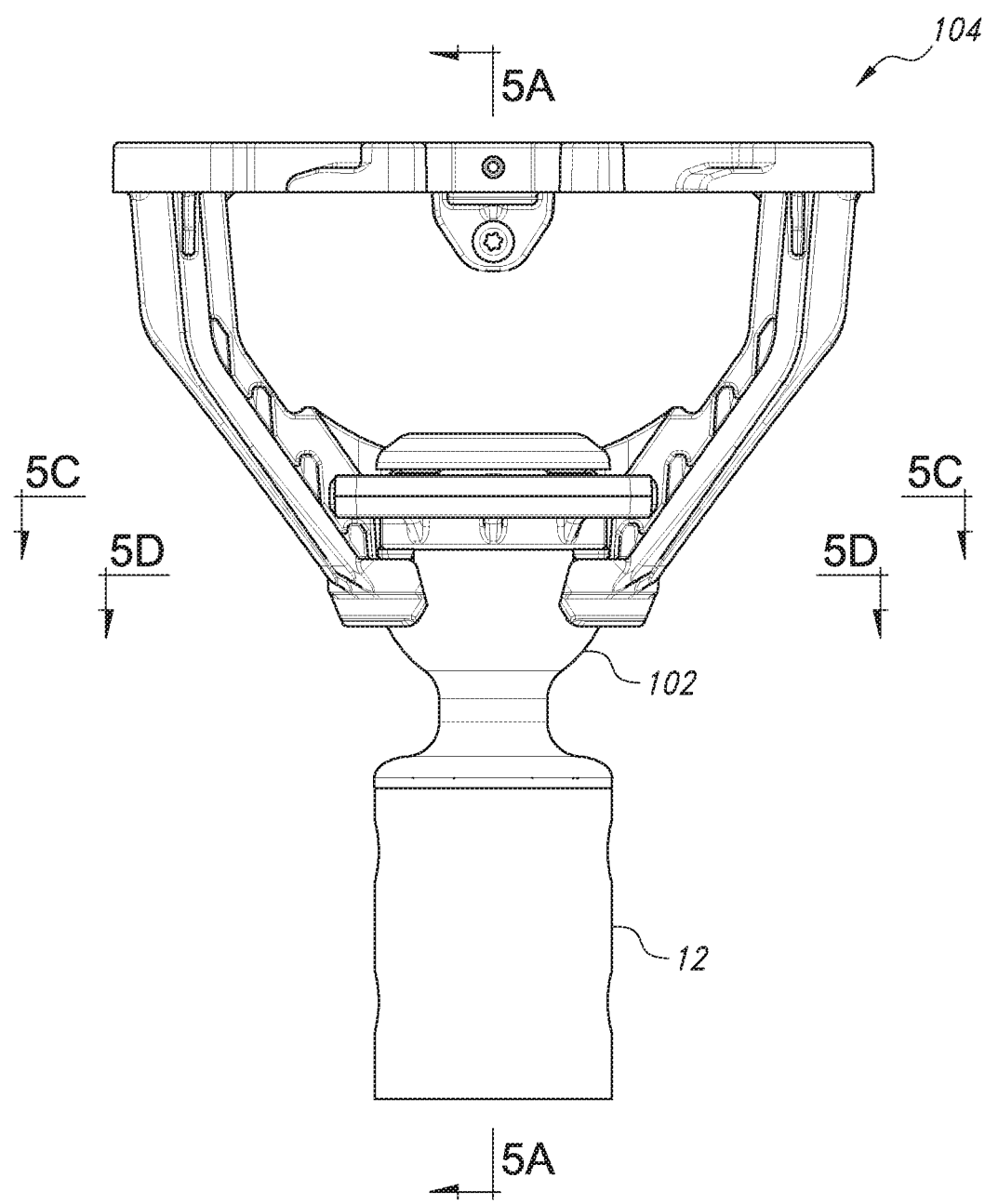
Figure 5A:
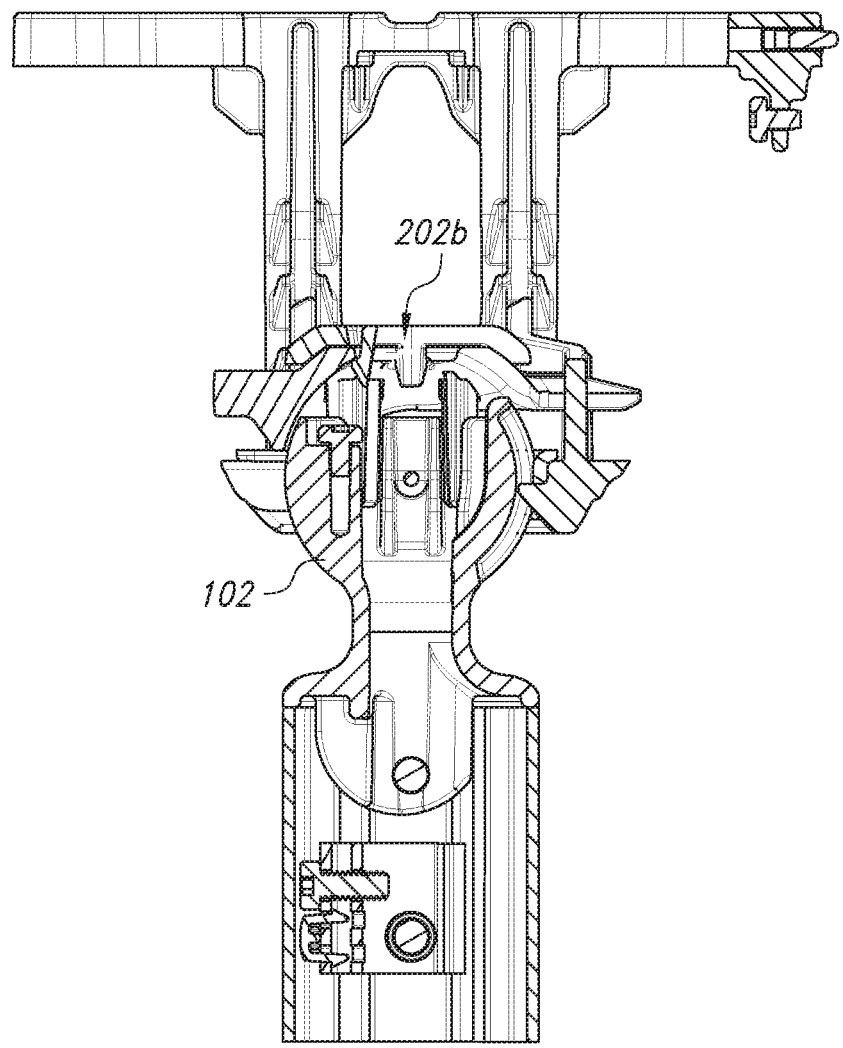
Figure 5B:
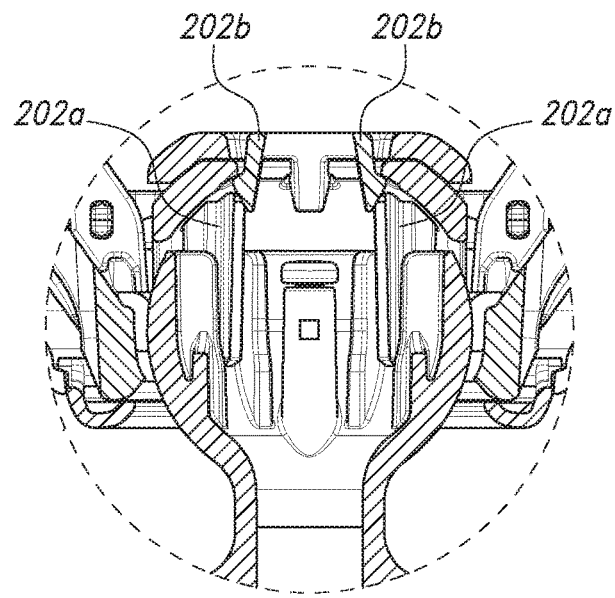
Figure 5C:
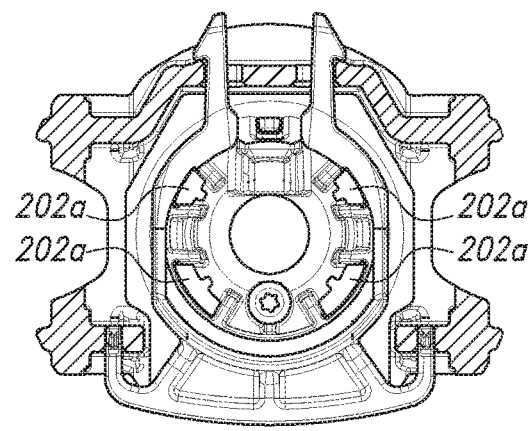
Figure 5D:
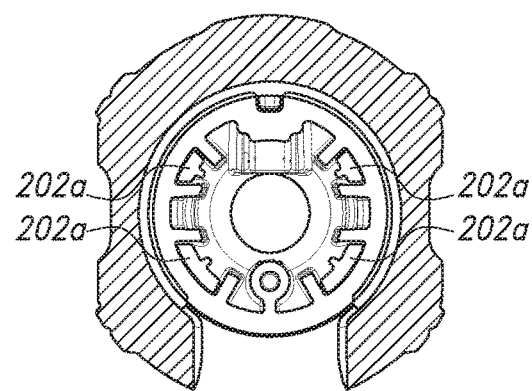
Figure 5E:
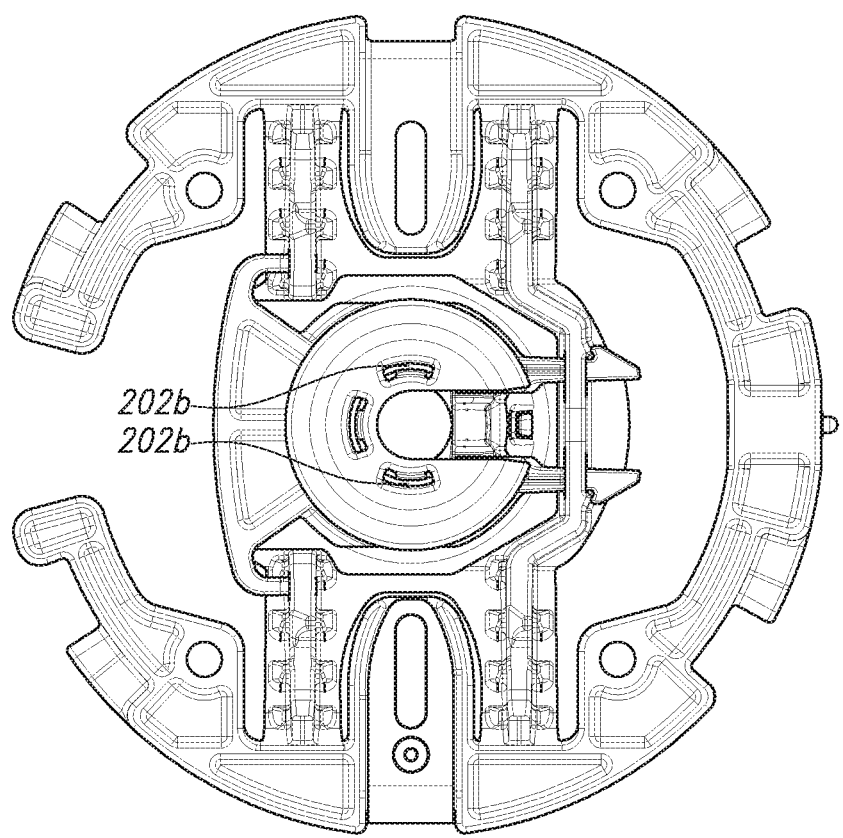
Figure 6:
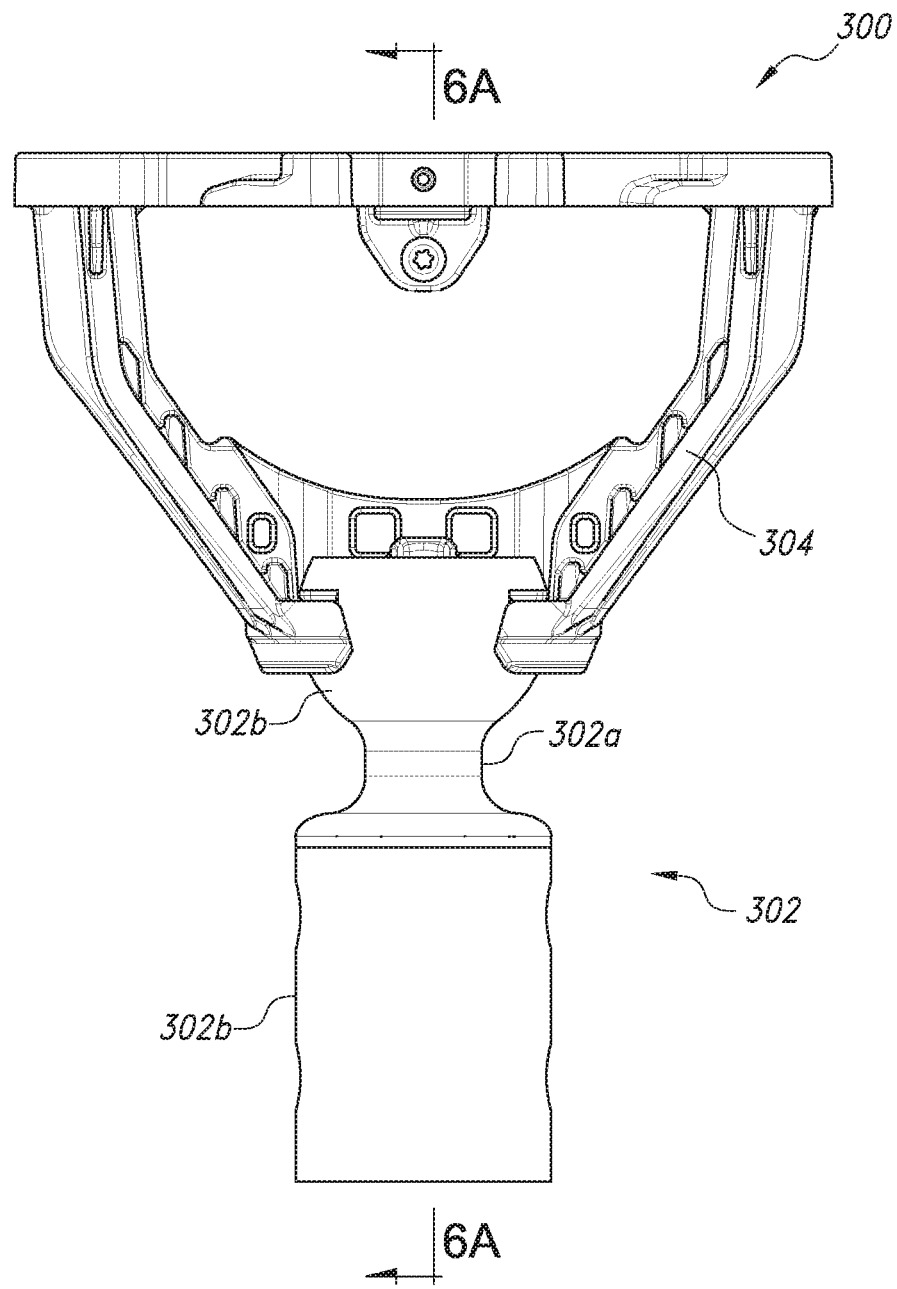
Figure 6A:
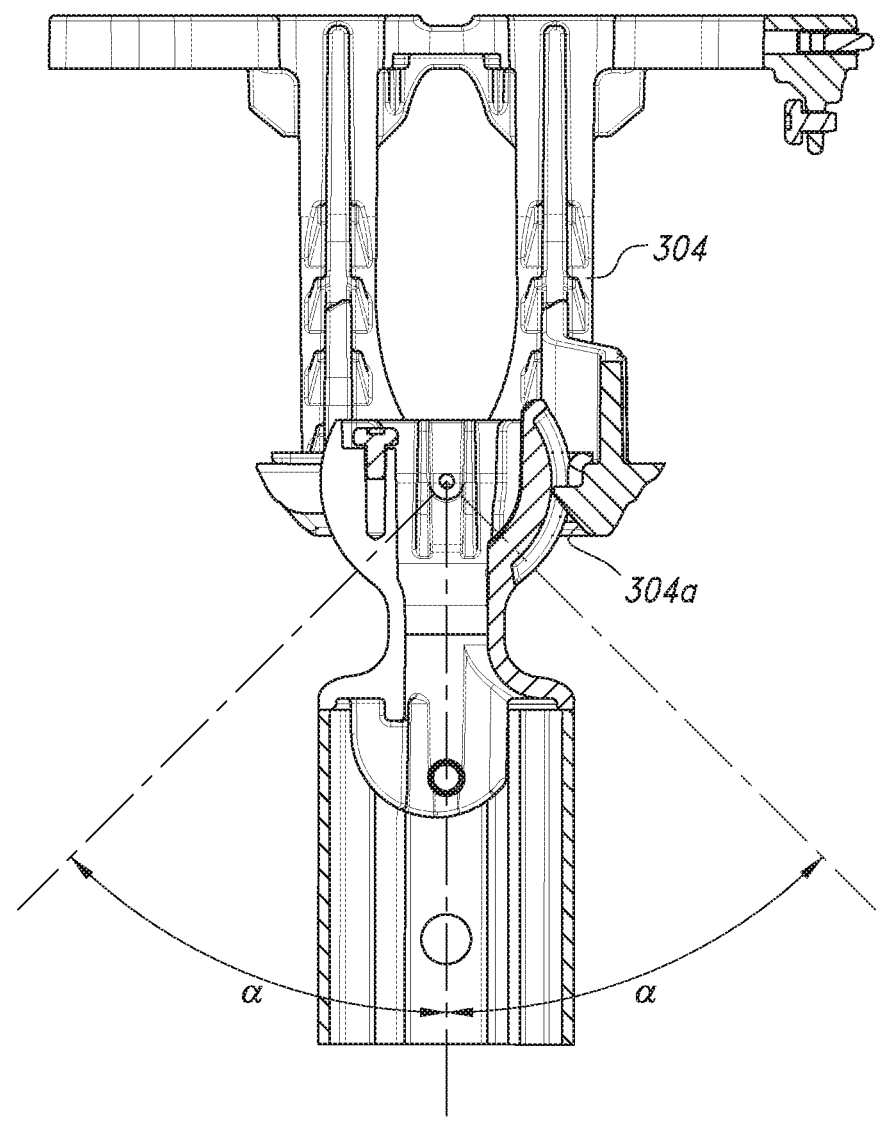
Figure 7:
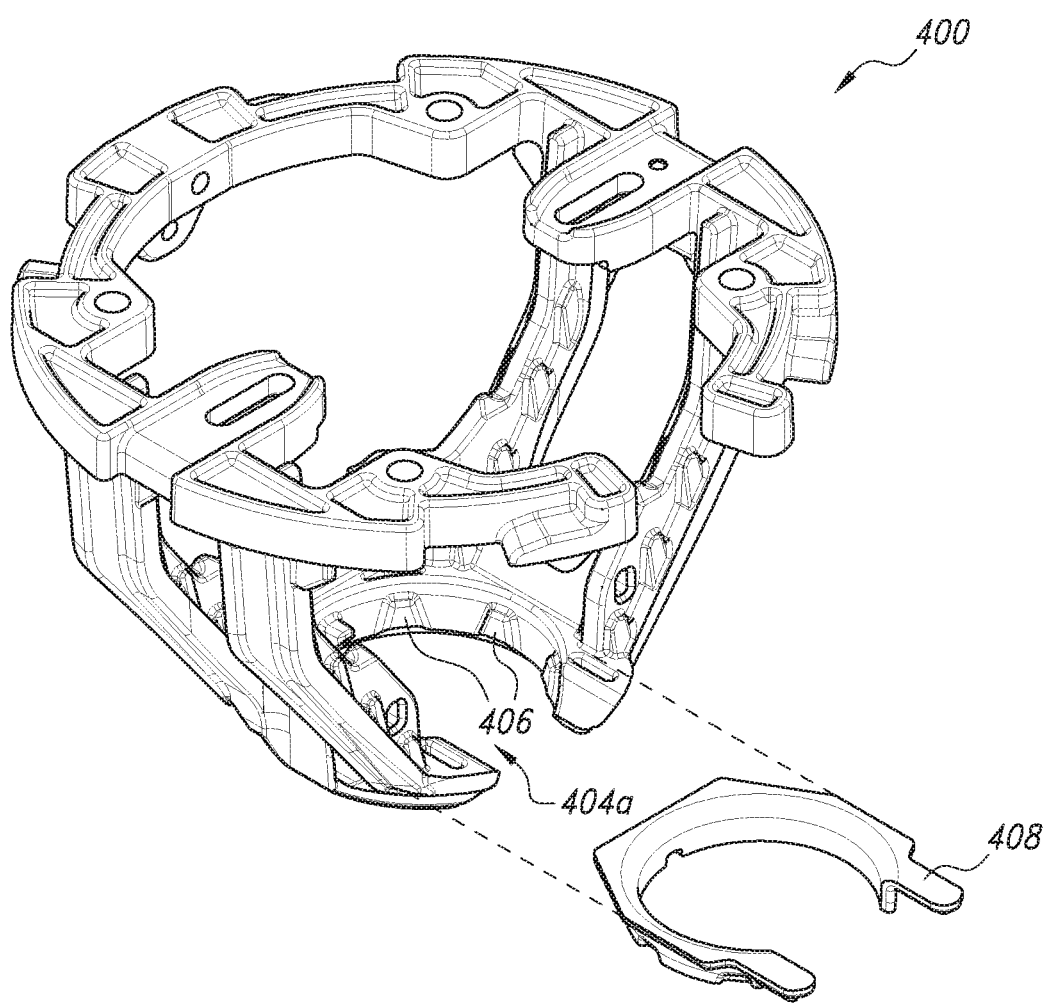
Figure 8:
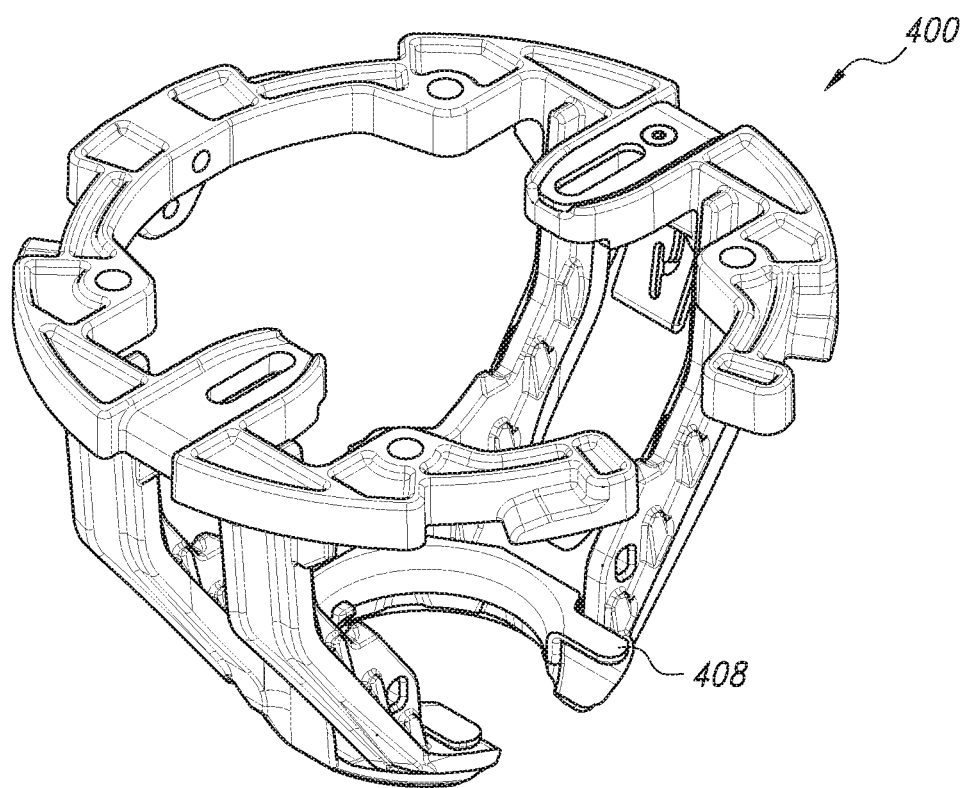
Figure 9:
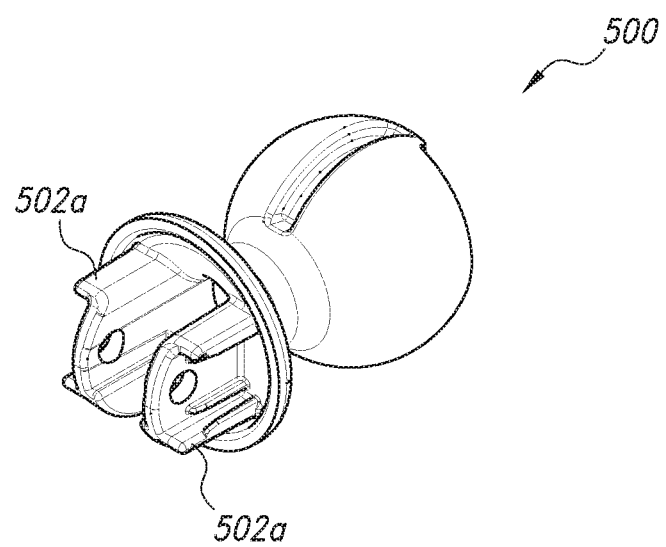
Figures 10, 11:
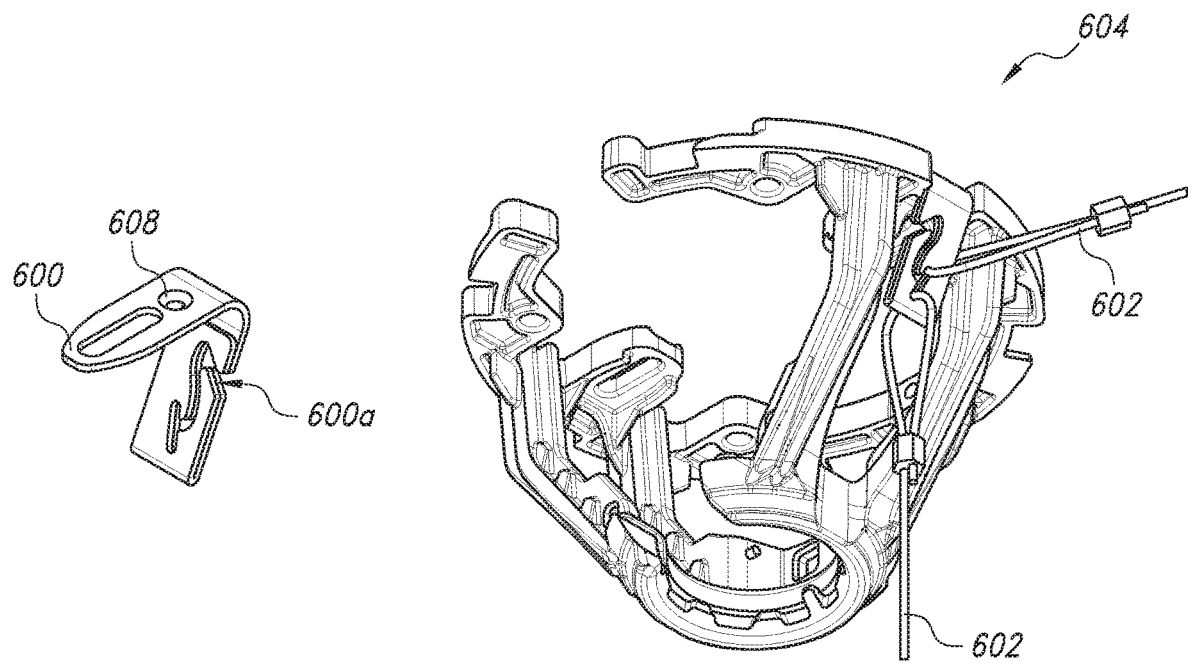
Figure 11A:
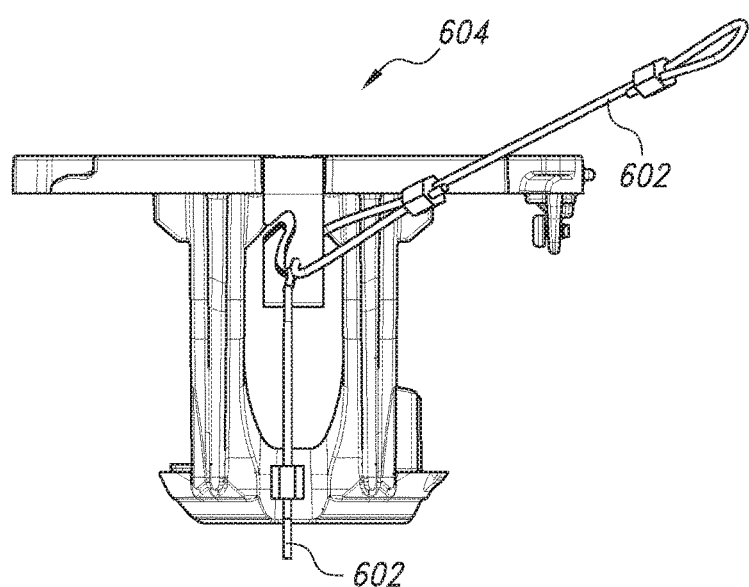
Figure 11B:
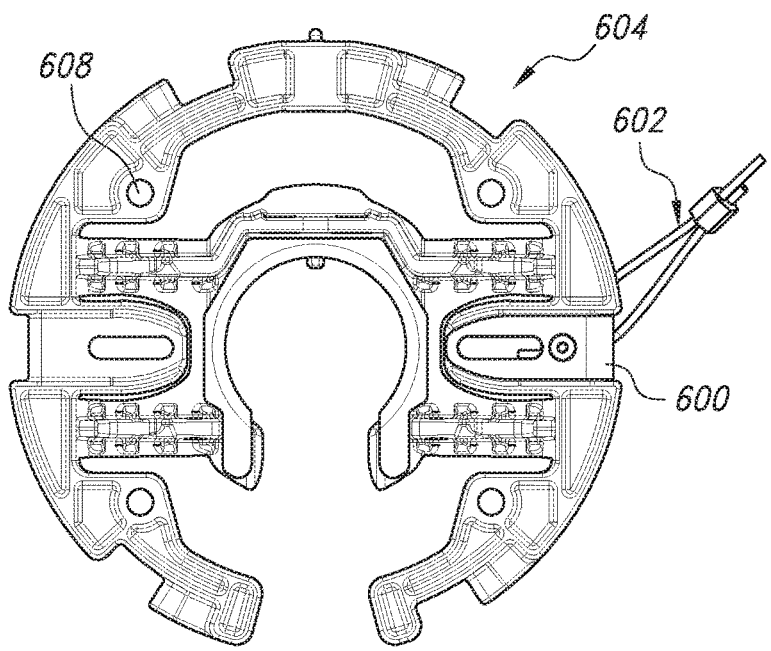
Figure 12:
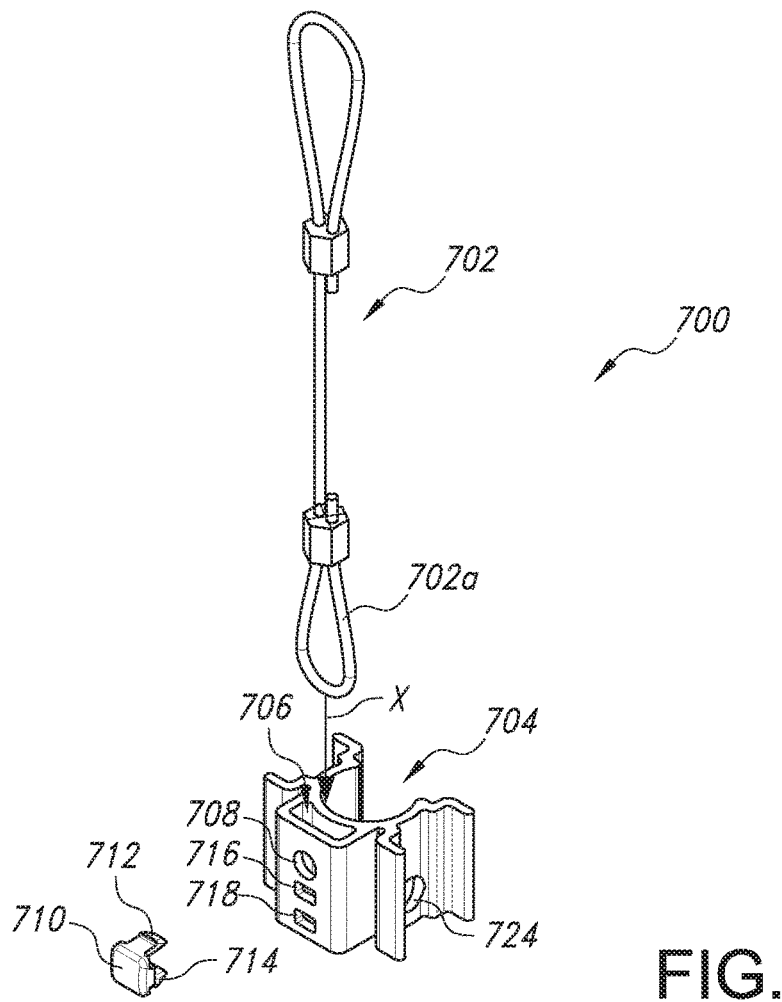
Figure 13:
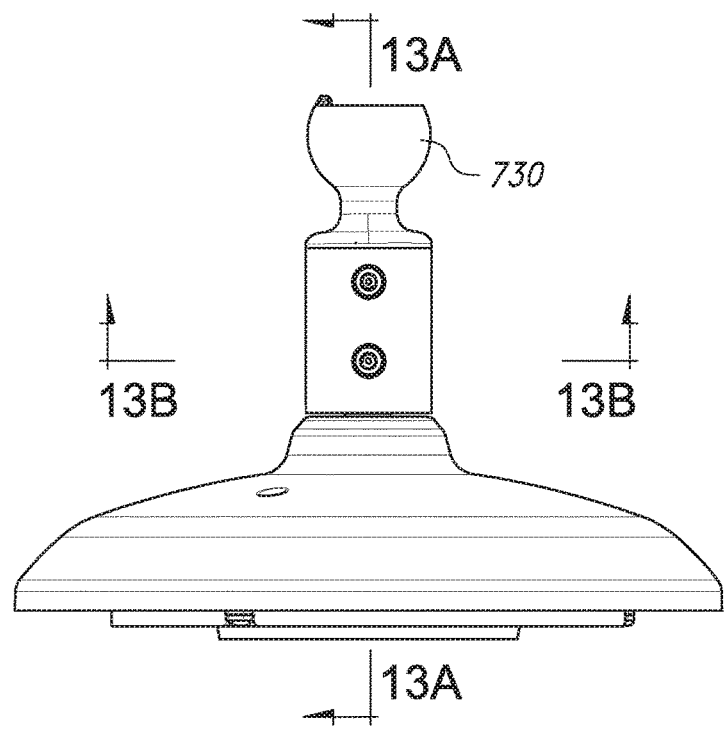
Figure 13A:
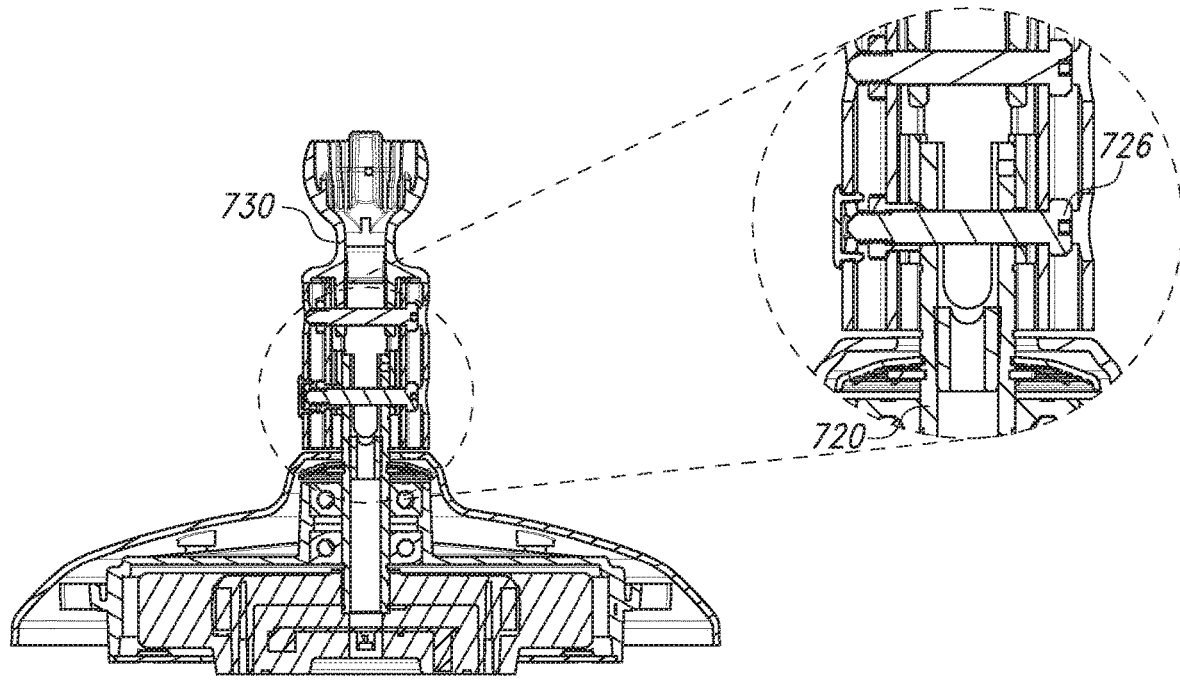
Figure 13B:
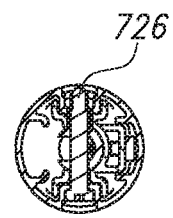
Figure 14:
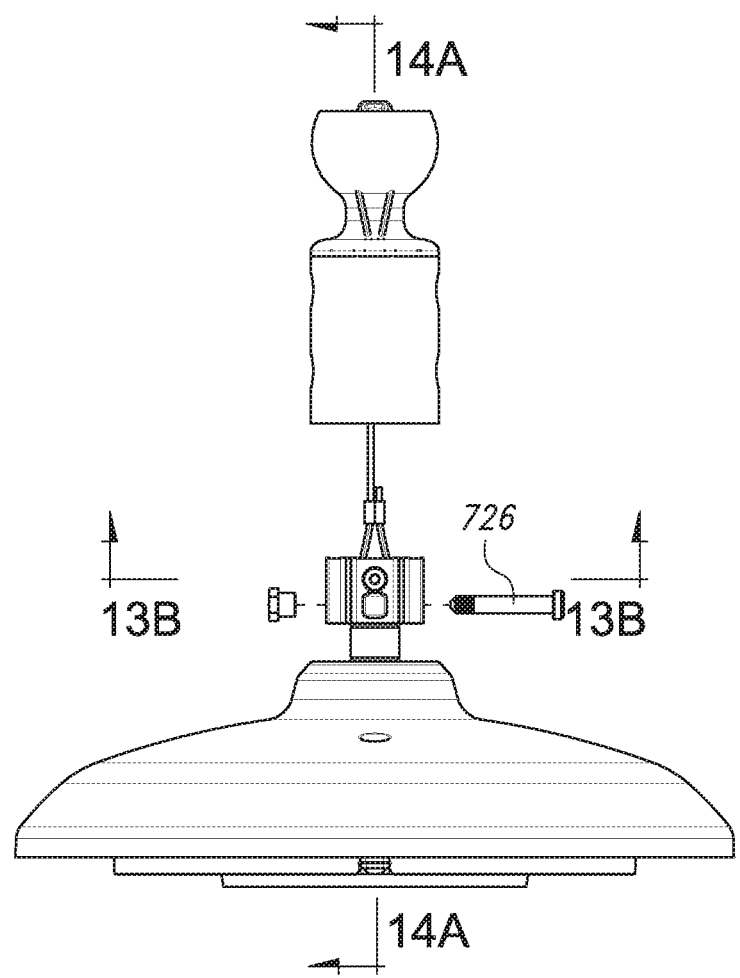
Figure 14A:
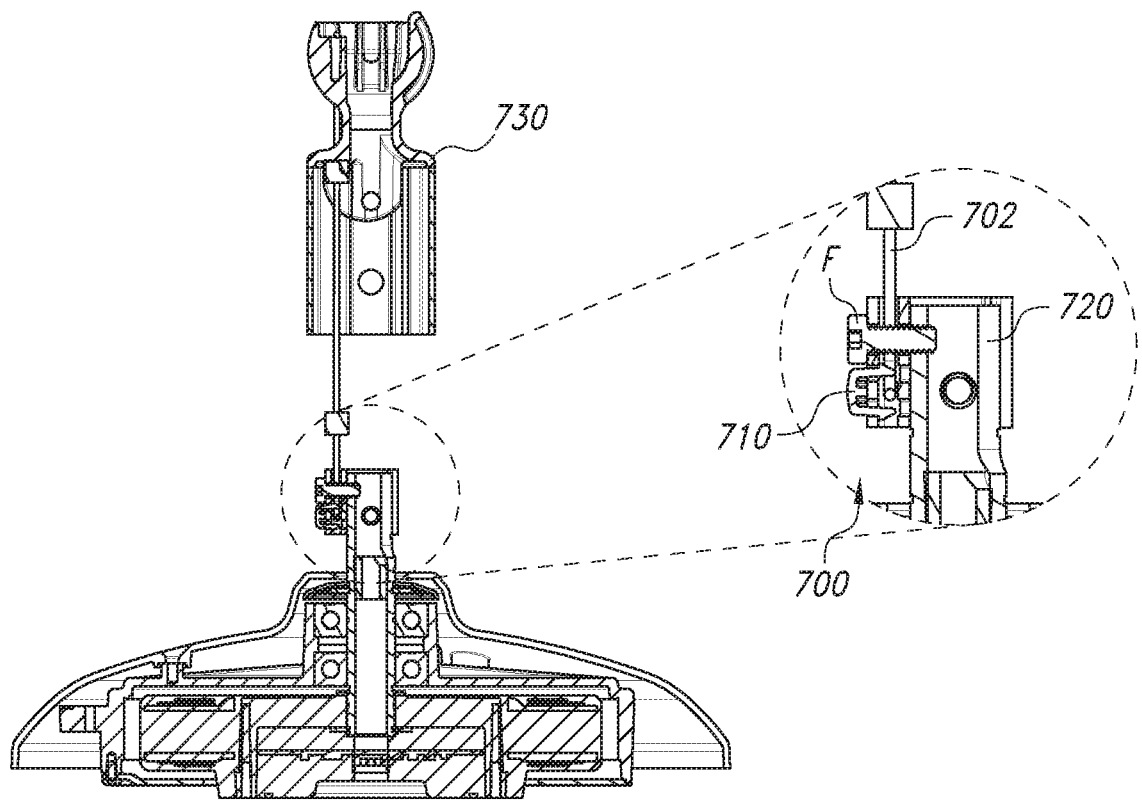
Figure 14B:
Figure 15:
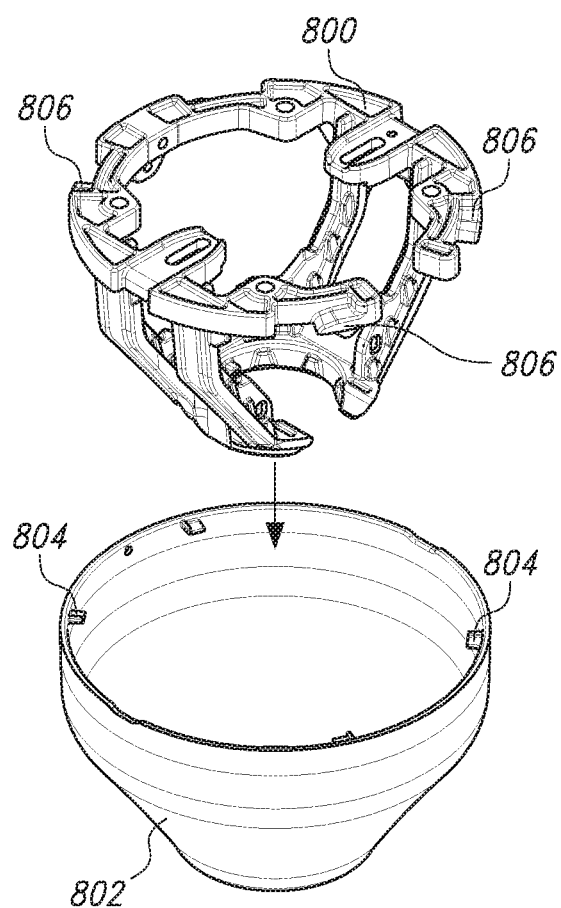
Figure 16:
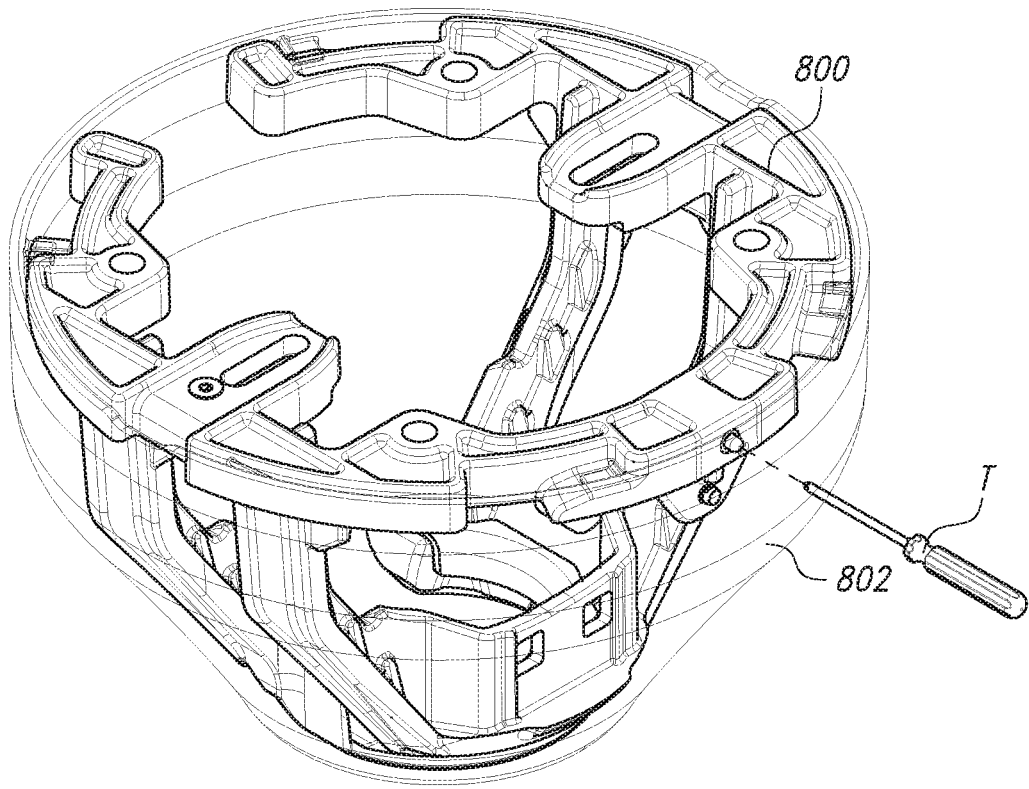
Figure 16A:
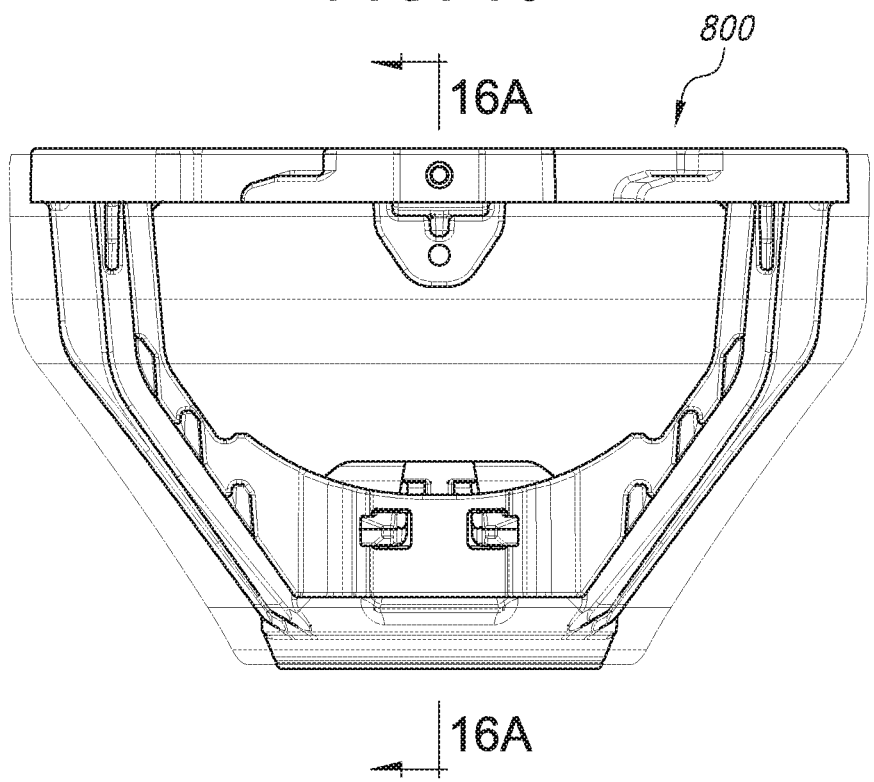
Figure 16B:
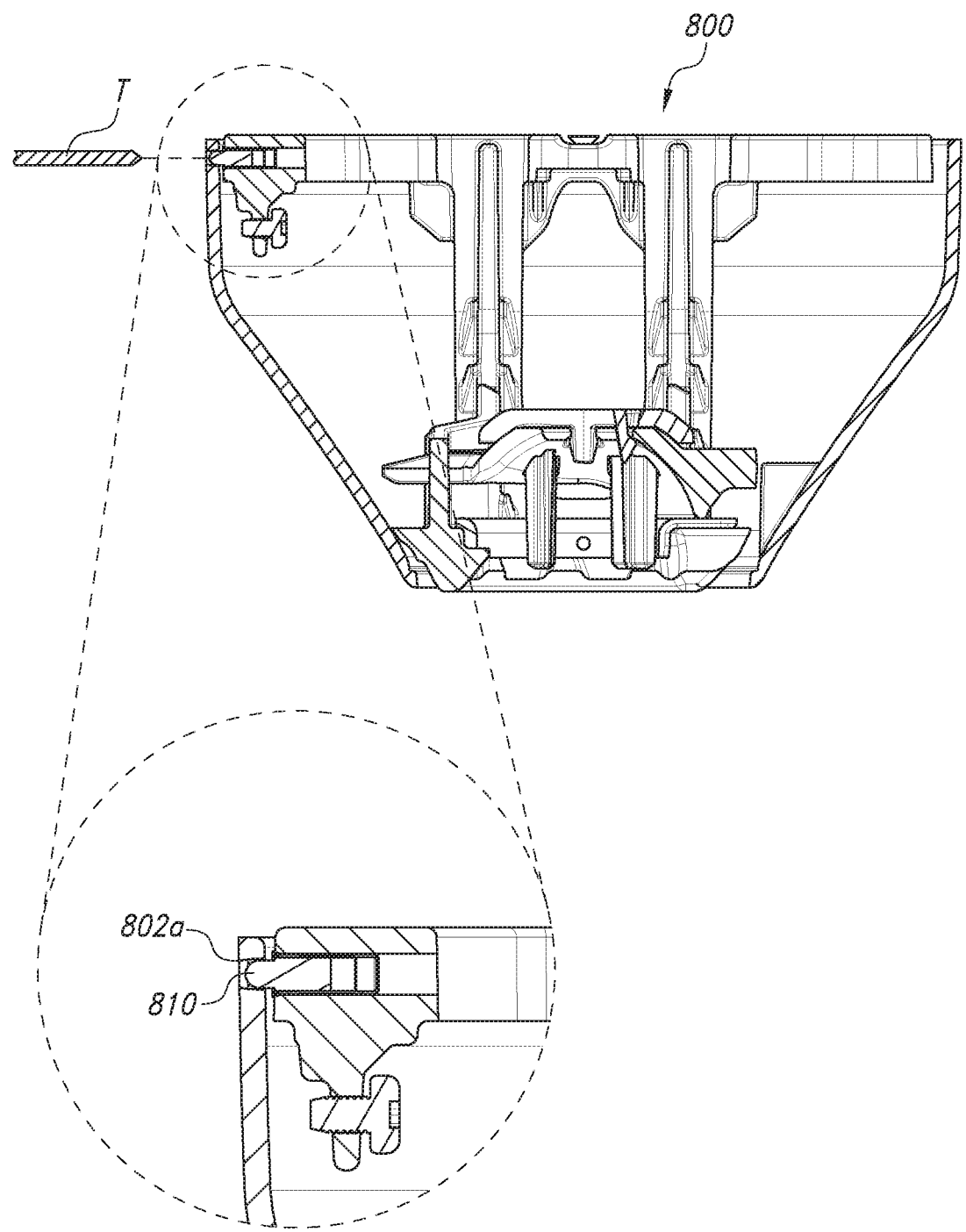

FIGS. 3, 3A, 3B, and 3C are side, cross-sectional side, cross-sectional top, and top views of a fan mount according to one aspect of the disclosure;

FIG. 4 is a partially exploded, partially cutaway view of a fan mount according to one aspect of the disclosure;

FIGS. 5, 5A, and 5B are side, cross-sectional side, and cross-sectional top views of a fan mount according to one aspect of the disclosure;

FIGS. 5C, 5D, and 5E are cross-sectional top and top views of a fan mount according to one aspect of the disclosure;

FIGS. 6 and 6A are side and cross-sectional side views of a fan mount according to one aspect of the disclosure;

FIG. 7 is a partially exploded view of a fan mount according to the disclosure;

FIG. 8 is an assembled view of the fan mount of FIG. 7;

FIG. 9 is a bottom perspective view of a ball member according to one aspect of the disclosure;

FIG. 10 is a perspective view of a retainer for a safety connector;

FIGS. 11, 11A, and 11B are perspective, side and top views of a fan mount according to one aspect of the disclosure;

FIG. 12 is an exploded view of a retainer for a safety connector;

FIGS. 13, 13A, and 13B are side, cross-sectional side, and cross-sectional top views of a fan mount according to one aspect of the disclosure;

FIGS. 14, 14A, and 14B are side, cross-sectional side, and cross-sectional top views of a fan mount according to one aspect of the disclosure;

FIG. 15 is an exploded view of a fan mount and cover according to one aspect of the disclosure;

FIGS. 16, 16A, and 16B are perspective, side, and cross-sectional side views of a fan mount according to one aspect of the disclosure; and FIGS. 17, 17A, 18, 18A, 19 and 19A are side and cross-sectional side views of a fan mount according to one aspect of the disclosure.

DETAILED DESCRIPTION

The following description of certain examples of embodiments of the disclosed inventions should not be used to limit the scope of the disclosure. Other examples, features, aspects, embodiments, and advantages of the inventions will become apparent to those skilled in the art from the following description, which includes by way of illustration, one or more of the best modes contemplated for carrying out the invention. As will be realized, the inventions are capable of other different and obvious aspects, all without departing from the invention. Accordingly, the drawings and descriptions should be regarded as illustrative in nature and not restrictive.

Figure 1:
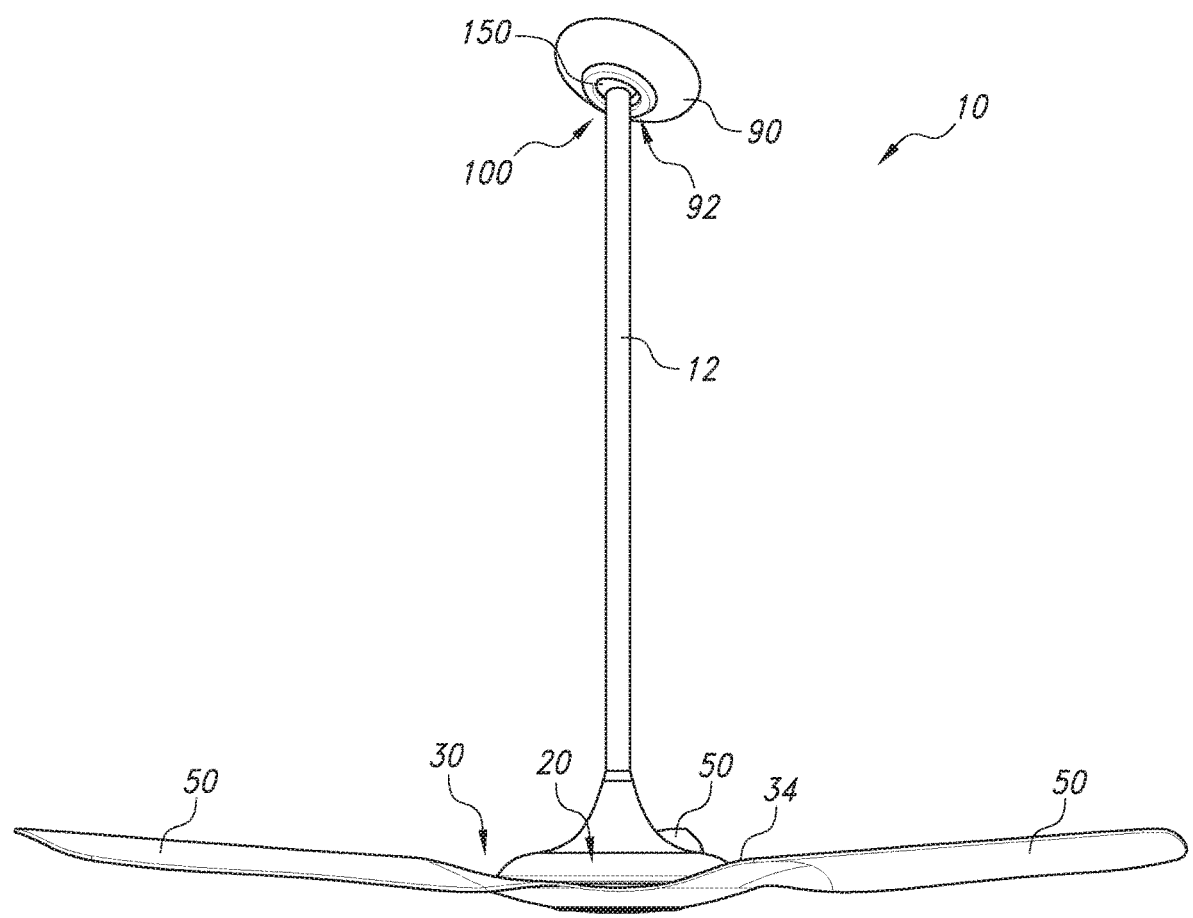
FIG. 1 is a front view of an exemplary fan.

FIG. 1 depicts an exemplary fan 10 having a motor 20, a hub 30 coupled to motor 20, and a plurality of fan blades 50 coupled to hub 30. In the present example, fan 10 (including hub 30 and fan blades 50) has a diameter of approximately 5 feet. In some versions, fan 10 has a diameter of approximately 7 feet. In other variations, fan 10 has a diameter between approximately 6 feet, inclusive, and approximately 24 feet, inclusive. Further still, fan 10 may have any other suitable dimensions, such as 3 feet, inclusive, to 30 feet, inclusive. Except as otherwise described herein, fan 10 may be constructed and operable in accordance with at least some of the teachings of any of the references that are cited herein; and/or in any other suitable fashion.

By way of example only, motor 20 may be constructed in accordance with at least some of the teachings of U.S. Pat. Pub. No. 2009/0208333, entitled "Ceiling Fan System with Brushless Motor," published Aug. 20, 2009, the disclosure of which is incorporated by reference herein. Furthermore, fan 10 may include control electronics that are configured in accordance with at least some of the teachings of U.S. Pat. Pub. No. 2010/0278637, entitled "Ceiling Fan with Variable Blade Pitch and Variable Speed Control," published Nov. 4, 2010, the disclosure of which is incorporated by reference herein. Alternatively, motor 20 may have any other suitable components, configurations, functionalities, and operability, as will be apparent to those of ordinary skill in the art in view of the teachings herein.

In the present example, motor 20 is coupled to a support 12, sometimes also known as a "downrod," adapted to couple fan 10 to a ceiling or other support structure a mount 100, as will be described in greater detail below. By way of example only, support 12 and/or mount 100 may include features of or be constructed in accordance with at least some of the teachings of U.S. Pat. Pub. No. 2009/0072108, entitled "Ceiling Fan with Angled Mounting," published Mar. 19, 2009, and issued Apr. 10, 2012 as U.S. Pat. No. 8,152,453, the disclosure of which is incorporated by reference herein, and/or in any other suitable configuration. In some versions, motor 20 may be remote from hub 30 and may be coupled via an axle or other component that is operable to transmit rotational movement from motor 20 to hub 30. Still other configurations will be apparent to one of ordinary skill in the art in view of the teachings herein.

In the present example, an escutcheon or cover 90, substantially shrouds mount 100 such that only a portion of it is exposed through cover 90. Cover 90 may comprise a substantially hollow hemispherical cover with a central opening 92 to permit a portion of support 12 to extend therethrough, but can take other forms as described herein. In some versions, a seal may encircle opening 92 to substantially seal or otherwise limits the passage of material through any gap that would otherwise exist. Such a seal may comprise a rubber (natural or synthetic), polymer, felt, or other material annular member that is positioned in or around opening 92. In addition, or in the alternative, the seal may comprise a plurality of fiber strands to form a brush-like ring about ball member 150. The seal may be coupled to cover 90 via a plurality of mechanical fasteners (e.g., screws, bolts, etc.), though this is merely optional. In some versions, the seal may be adhesively attached and/or inserted into a slot or other feature of cover 90 to retain the seal therein. In some versions the seal may be omitted entirely. Of course, still other configurations for cover 90 and/or seal 94 will be apparent to one of ordinary skill in the art in view of the teachings herein.

As demonstrated in the example shown in FIG. 1, mount 100 permits support 12 and fan 10 to pivot about various axes that are perpendicular to the longitudinal axis defined by support 12 such that fan 10 may be mounted to an angled ceiling, such as a cathedral ceiling or other non-level ceiling. Accordingly, fan 10 can substantially self-level via the weight of fan 10 during installation and thereafter. Support 12 can thus maintain a substantially vertical position when fan 10 is installed.

Figure 2:
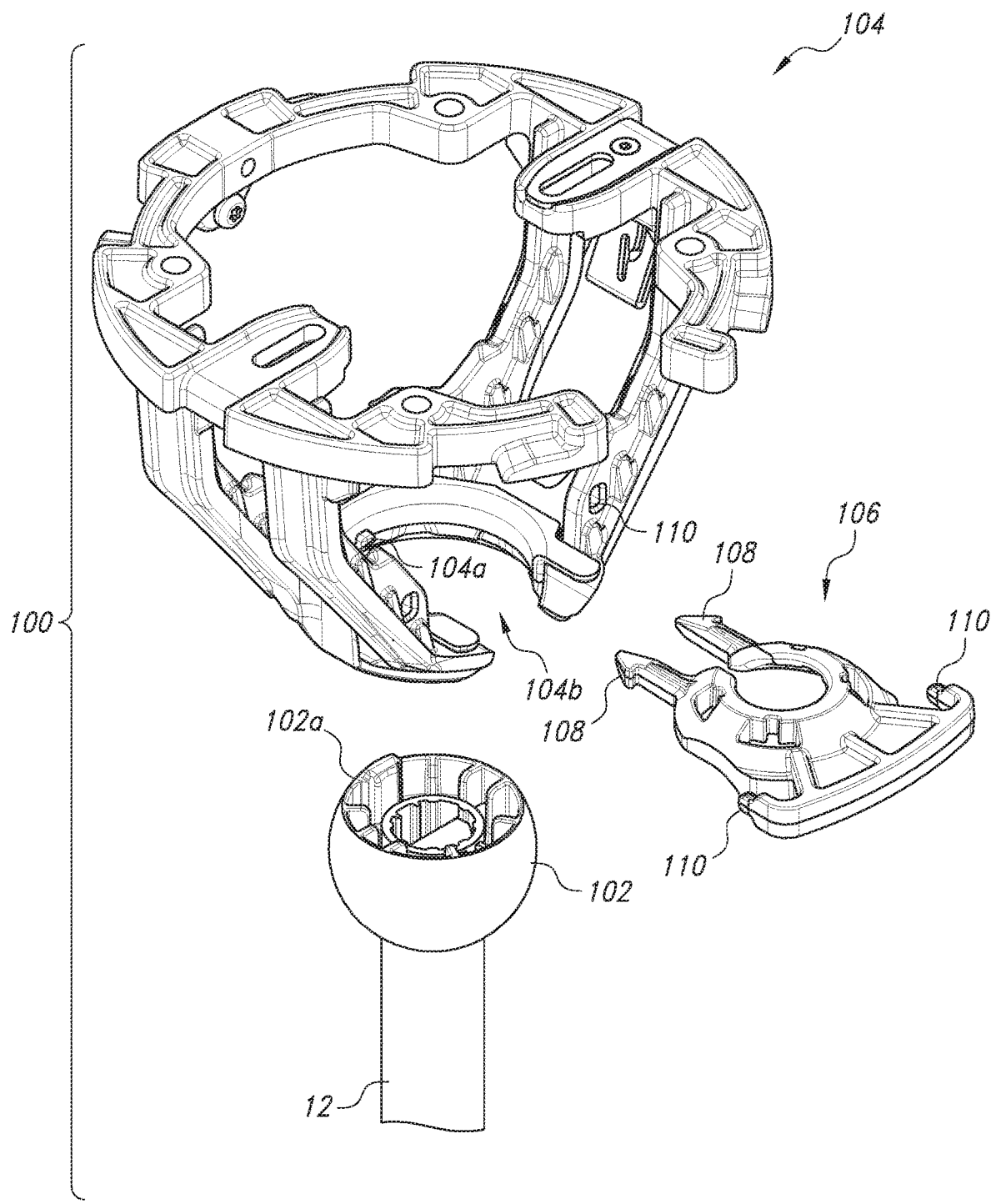
FIG. 2 is a partially exploded, partially cutaway view of a fan mount according to one aspect of the disclosure.

In a further aspect, and with reference to FIG. 2, the mount 100 may be adapted to retain a movable first part, such as a ball member 102 associated with the support 12. The ball member 102 may include a groove or slot 102a, which may be adapted to mate with a tab 104a of a socket 104b forming part of a second part, such as a mount 104, adapted for mounting to a stable support structure, such as a ceiling. This mating of the slot 102a with the tab 104a may allow for some degree of pivoting of the fan, while preventing the support 12, and hence the hub of the associated fan 10, from rotating with respect to the mount 104. However, fans that are exposed to high winds have the potential for a ball member 102 to be lifted out of the socket 104b. This may allow the ball member 102 to disengage from the socket 104b, thereby allowing the fan 10 to freely spin, and potentially causing the wiring to disconnect and render the fan inoperable.

Figure 2A:
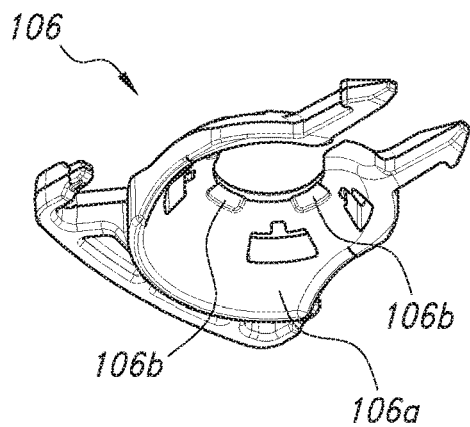
FIG. 2A is a bottom perspective view of a retainer forming part of the fan mount.
Figure 3:
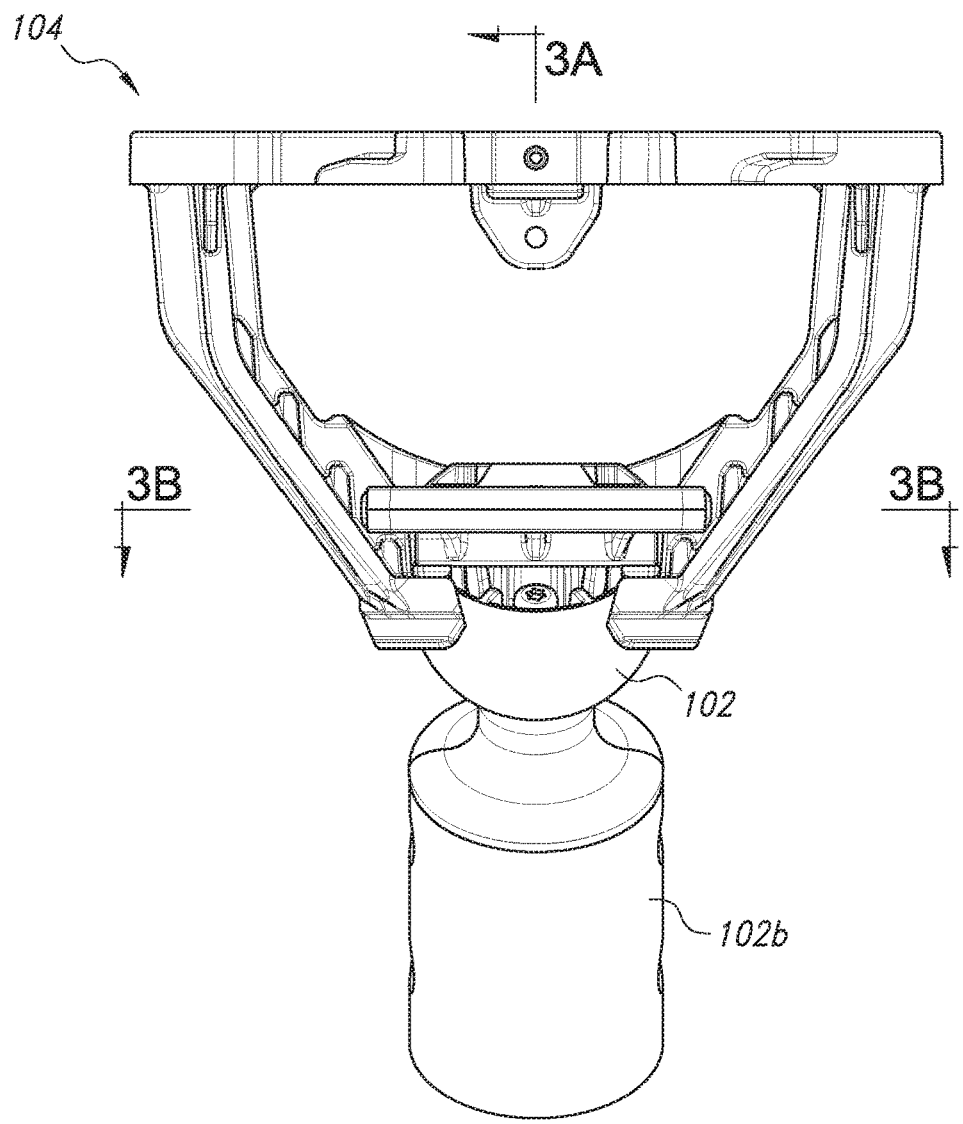
Figures 3A, 3B:
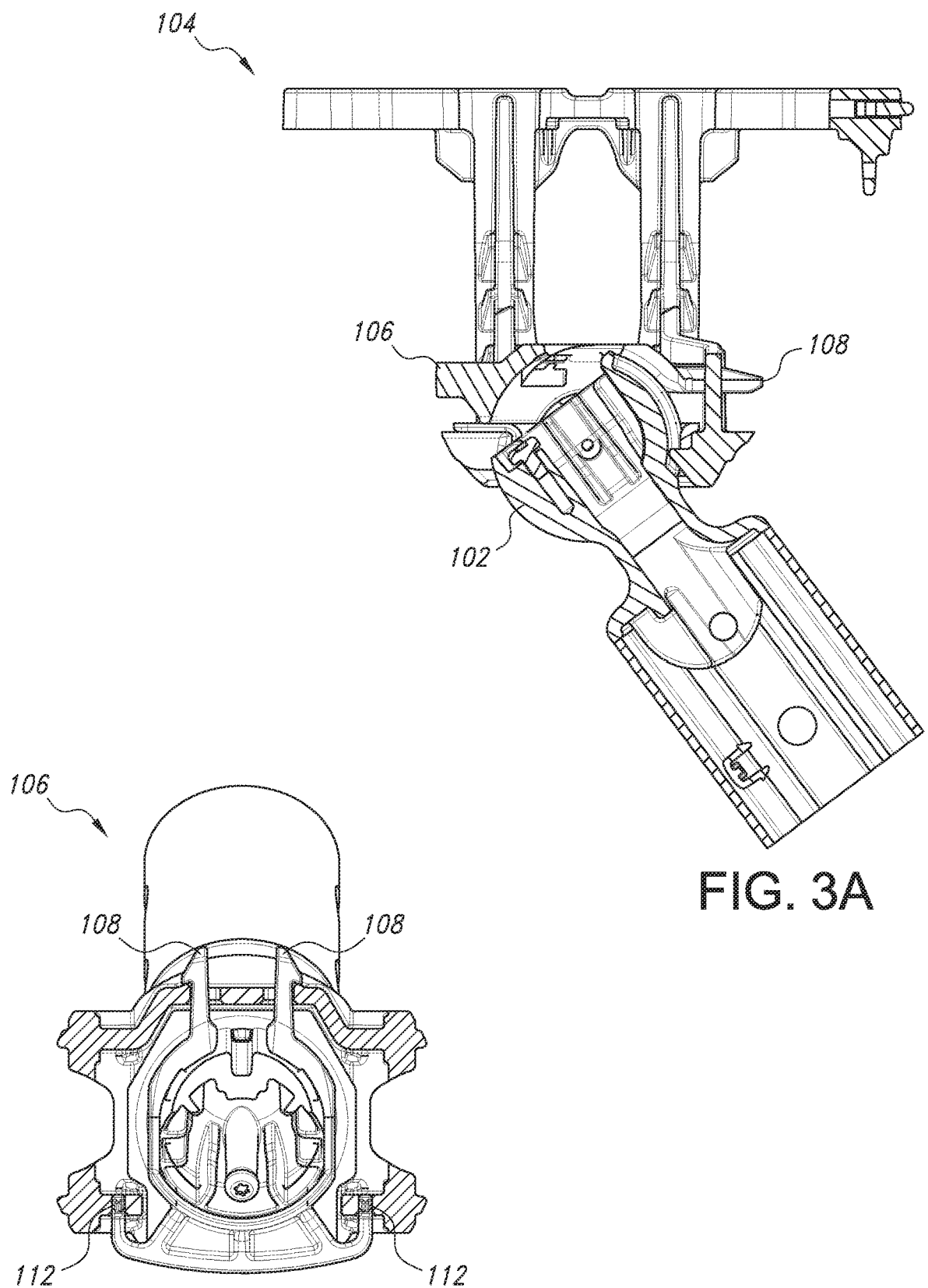
Figure 3C:
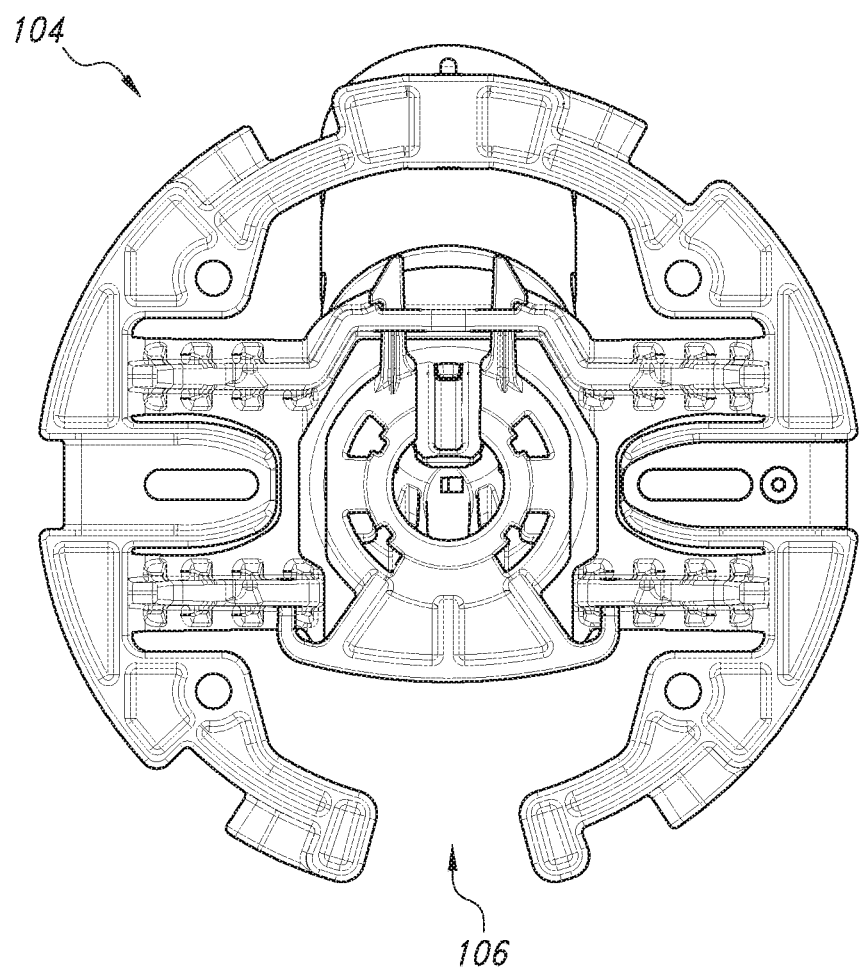

As can be seen in FIGS. 2-2A, a retainer 106 may be provided for retaining the ball member 102 within the socket 104b, such that the slot 102a is maintained in engagement with the tab 104a. The retainer 106 may be located above the ball member 102 when associated with the mount 104, and may include a lower surface 106a in the form of a hemisphere or other rounded shape adapted to engage an upper portion of the ball member 102. Once in place, the retainer 106 thus acts as a lid to retain the ball member 102 within the socket 104b.

With reference to FIGS. 3, 3A, 3B and 3C, the arrangement of the ball member 102 within the socket 104b of the mount 104, along with the retainer 106 may be visualized. The retainer 106 may include one or more first tabs 108 adapted to engage corresponding first receivers 110 at a first location on the mount 104. In addition, the retainer 106 may include one or more second tabs 112 adapted to engage corresponding second receivers 114 at a second location on the mount 104.

When the ball member 102 is in the socket 104b, the retainer 106 may be locked into place due to the engagement between the first and second tabs 108, 112 engaging the first and second receivers 110, 114, respectively. The tabs 108, 112 may include a snap feature, such as a barb, and may be resilient such that the tabs are compressed and then expanded into a locking engagement. This may allow for installation of the retainer 106 without any additional tools, and may also prevent unintended disengagement between the retainer. The ball member 102 may also include a receiver 102b for receiving the support (not shown), and fasteners may be used to fasten the structures together.

In another aspect, the mount 100 may be adapted to prevent swaying of the fan 10, such as in the presence of high wind. For example, on a flat ceiling, swaying of the fan has the potential to cause the blades to contact the ceiling, thereby resulting in damage to one or more of the fan and/or the ceiling.

With reference to FIGS. 4 and 5, 5A, 5B, 5C, 5D, and 5E a restrictor 200 may be provided to retain the fan in a plumb orientation. The restrictor 200 may include a first part 202 with depending projections 202a and locking tabs 202b, and a second part 206, which may be like the retainer 106 previously described. The locking projections 202a may be adapted to extend through apertures 206a in the second part 206 to engage the ball member 102 in order to maintain a stationary rotational position about a longitudinal axis of the support 12. For example, the ball member 102 may include one or more receivers 102c adapted to receive the projections 202a (see FIGS. 5A, 5B).

The tabs 202b may be adapted to fix the location of the first part 202 with respect to the second part 206, which again may be similar in form to the retainer 106. Specifically, as can be seen in FIG. 2A, the retainer 106 may include one or more receivers 106b for receiving the tabs 202b. The tabs 202b may be adapted to snap in place in the receivers 106b, such as via a barb, thereby avoiding the need for additional tools during assembly.

In another aspect, the mounting apparatus may include features that allow for a support (downrod) with a large diameter to be used on a sloping ceiling. Traditionally, when mounting a fan on a sloped ceiling, the user is limited to the use of a particular type of support, such as a thin downrod. This is because a wider diameter support (downrod) may interfere with the mount when oriented at an angle other than 90 degrees from the ceiling. Specifically, when a ball member rotates within a socket of a mount in the context of mounting a fan on a sloped ceiling, a wider diameter downrod attached to the ball member may contact the body of the mount and/or the cover and cause interference. Accordingly, users have traditionally been limited to downrods of a narrower diameter, which would provide a greater degree of rotation of the ball adapter within the socket of the mount without interference between the downrod and the mount.

With reference to FIGS. 6 and 6A, a further mounting assembly 300 is provided, which includes a ball member 302 having a thin section 302a between two wider sections 302b, to form an hourglass shape. One of the wider sections may be in the form of the ball adapted to fit within the socket 304a of the mount 304. When the ball member 302 is placed within the socket 104b, the thin section provides for a greater range of angular motion of the downrod with respect to the mount. Specifically, a tapered lower portion 304b of the mount 304 may be allowed to interact with the thin section 302a of the ball member 302 to allow a greater pivot angle between a wide downrod and the mount than would be allowed in the case of a wide downrod connected directly to the ball adapter without the thin section. Stated another way, the hourglass shape of the ball member 302 corresponds to the tapered lower portion 304b of the mount 304 to allow for greater range of pivoting motion. For example, the pivoting may be such that the fan 10 may be mounted on a 40 degree sloped ceiling (note angle α, measured from vertical) without interfering with the mount, but of course variations above and below this value are possible.

According to another embodiment, and with further reference to FIG. 7, a mount 400 may be provided in which the ball member (not shown) is retained within the socket 404a by a retainer comprising one or more radial projections 406 spaced circumferentially about the socket 404a. The projections 406 may frictionally engage the ball member 402, such as by wedging the ball member into place in the socket 404a. Additionally or alternatively, as shown in FIGS. 8 and 8A, the retainer may further comprise a dampener 408 may be provided to reduce noise and wear between the ball member and the mount 400. The dampener 408 may be adapted for insertion within the socket 404a, and may correspond in size and shape thereto.

Turning to FIG. 9, a ball member 500 according to another embodiment may include a receiver comprising one or more projections 502a, such as ribs, which may be adapted for receiving the support 12. The projections 502 may create a friction or interference fit within the support 12. This may reduce the chance of loose components and may create a ground path when inserted into the support 12. A fastener, such as a socket head cap screw (not shown), may be provided for fixing the support with respect to the ball member 500.

In addition, this disclosure contemplates an improved safety connector anchor. Current safety connectors, typically in the form of a cable, are attached to the mount via a fastener, which may require a tool or some mechanism that wraps around the mount. Such a configuration may be cumbersome and or confusing, this also often causes the end user to not properly anchor the safety cable to the mount.

With reference to FIG. 10, a retainer 600 may be included to provide an intuitive and easy attachment of a safety connector, such as a cable 602 or the like. The retainer 600 may include a receiver 600a, which may be in the form of a cutout with a labyrinth or serpentine pattern. The receiver 600a may be in a vertical side of the retainer 600, to retain one or more safety cables 602 without the need of added hardware or tools for installation by an end user.

As shown in FIGS. 11, 11A, and 11B, the retainer 600 may be adapted to attach to a mount 604. For example, the mount 604 may include a recess 604a for receiving the retainer 600. The recess 604a may correspond in size and/or shape to the retainer 600 to ensure a stable fit therebetween. One or more fasteners 606, such as a screw or bolt, may be provided for retaining the retainer 600 on the mount 604. Additionally or alternatively, the retainer 600 and the mount 604 may include one or more apertures 608, which may be adapted to receive one of the two primary fasteners (e.g. bolts or screws) adapted to attach the mount to the junction box in the ceiling to which the fan is being mounted.

In a further concern with traditional fan mounts, there may be no manner of ensuring that the safety cable has been attached. As can be seen in FIGS. 12, 13, and 14, a retainer 700 may be provided that may be attached to the safety cable 702. FIG. 12 illustrates one aspect of such an attachment. The retainer 700 may be adapted to connect to the fan support (downrod) such as via a friction fit or an interference fit. In one aspect, the retainer 700 may include a channel 704, which may be aligned with the longitudinal axis X of the support in use.

The retainer 700 may further include a receiver 706 and an aperture 708. The aperture 708 may extend to the channel 704. A fastener F may be inserted through aperture 708 (see, e.g., FIG. 14A) for fastening it to a motor shaft 720. A loop 702a of the safety cable 702 may be inserted into the receiver 706. In addition, a fastener 710 may be provided for locking the safety cable 702 in position with respect to the retainer 700. As illustrated, the fastener 710 may include one or more projections 712, 714, adapted to pass through apertures 716, 718.

In use, the projections 712, 714 may be placed through the apertures 716, 718 of the retainer 700, passing through the loop 702a of the safety cable 700 as well. In one aspect, the projections 712, 714 include barbs for creating a snap-fit and preventing removal of the fastener 710, and hence the safety cable 702, from the retainer 700, once in place.

In another aspect, the retainer 700 may include a passage 724 for receiving a fastener 726 for connecting with the motor shaft 720, and the support 12. In use, the motor shaft 722 may be placed within the retainer 700, which may in turn connected to the ball member 730, which may be associated with mount (not shown). Each of these elements may include a series of corresponding openings which align with the passage 724. Insertion of fastener 726 fixes the relative positions of each of these elements, thereby reducing relative movement and "wobble" of the fan.

The mounts according to the disclosure may include a cover. The normal process for installing a cover is to attach it via multiple fasteners, such as screws, which may require a tool for attachment. This may be cumbersome for the user, as installations of ceiling fans are typically accomplished in precarious positions, such as on top of a ladder. Not only can the use of a tool for installation be awkward or even dangerous, but it is often possible to drop fasteners, which may at the very least cause frustration for the installer.

With further reference to FIG. 15, the mount may allow for attachment of the cover without the need for any tools. As illustrated, the mount 800 may be adapted for insertion into or nesting within the cover 802. One or more radially extending projections 804 may be provided in the cover 802 for engagement with one or more receivers 806 in the mount 800, such as to form a bayonet fitting. The receivers 806 may be in the form of a ramp included in or on the mount 800. As illustrated, the projections 804 are located along an upper perimeter of the cover 802, such that the cover 802 may be rotates so that the projections 804 engage the receivers 806 and retain the cover on the mount, thus allowing for quick and easy installation of the cover without a tool.

Referring to FIGS. 16, 16A, and 16B, the mount 800 may also include a releasable locking element, such as a spring-loaded pin 810, biased toward an aperture 802a in the cover 802. The pin 810 would thus normally retain the structures in a locked condition, and allow for relative rotation when released (such as using a tool T).

In another aspect, a universal mount allows for the same cover to be used with both flat and sloped ceilings. This provides an improvement over the prior art, which normally would require different covers for flat and sloped ceilings, with a completely different mounting systems for flat eight foot ceilings (often referred to as "hugger" fans).

Figure 17:
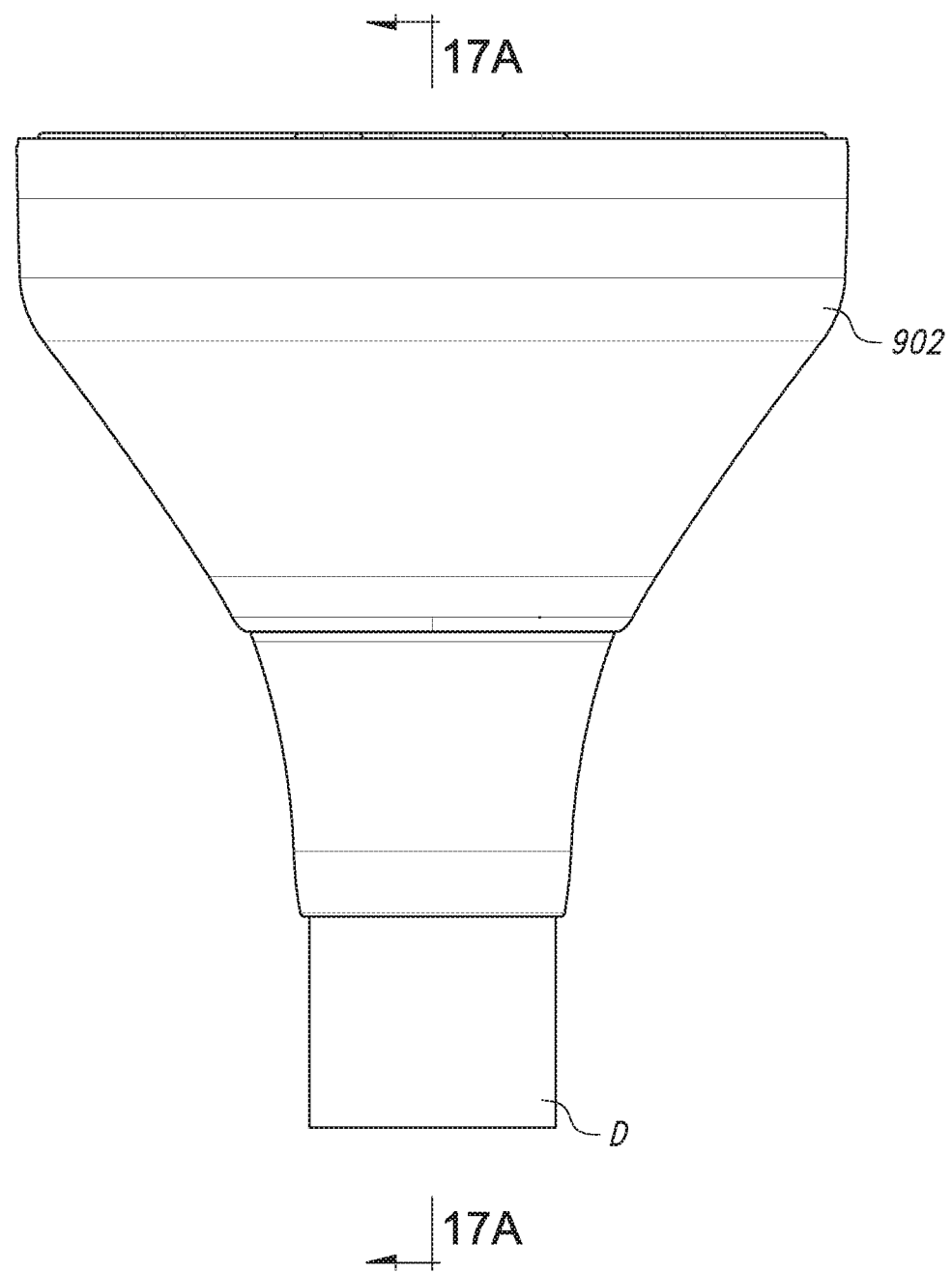
Figure 17A:
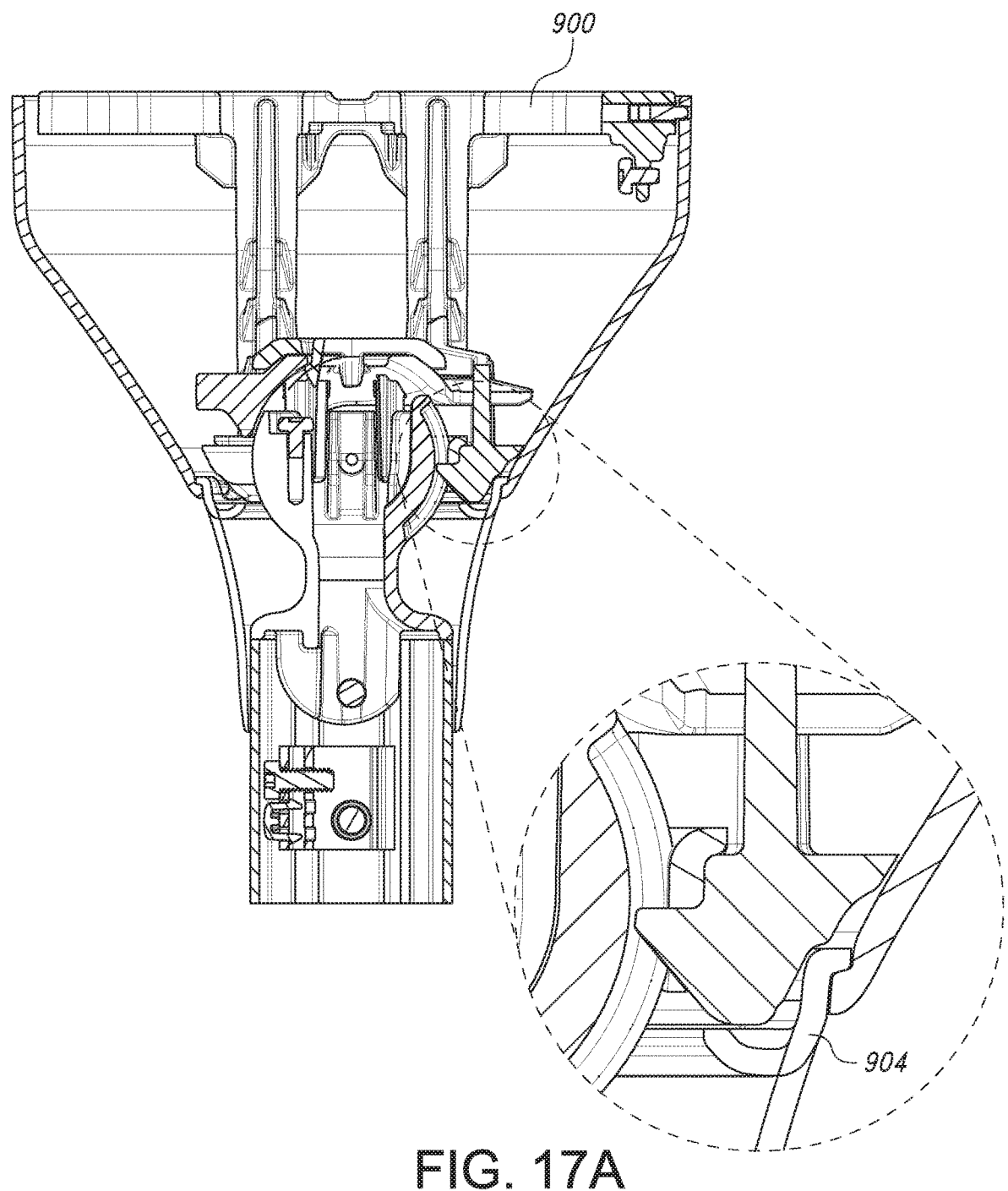
Figure 18:
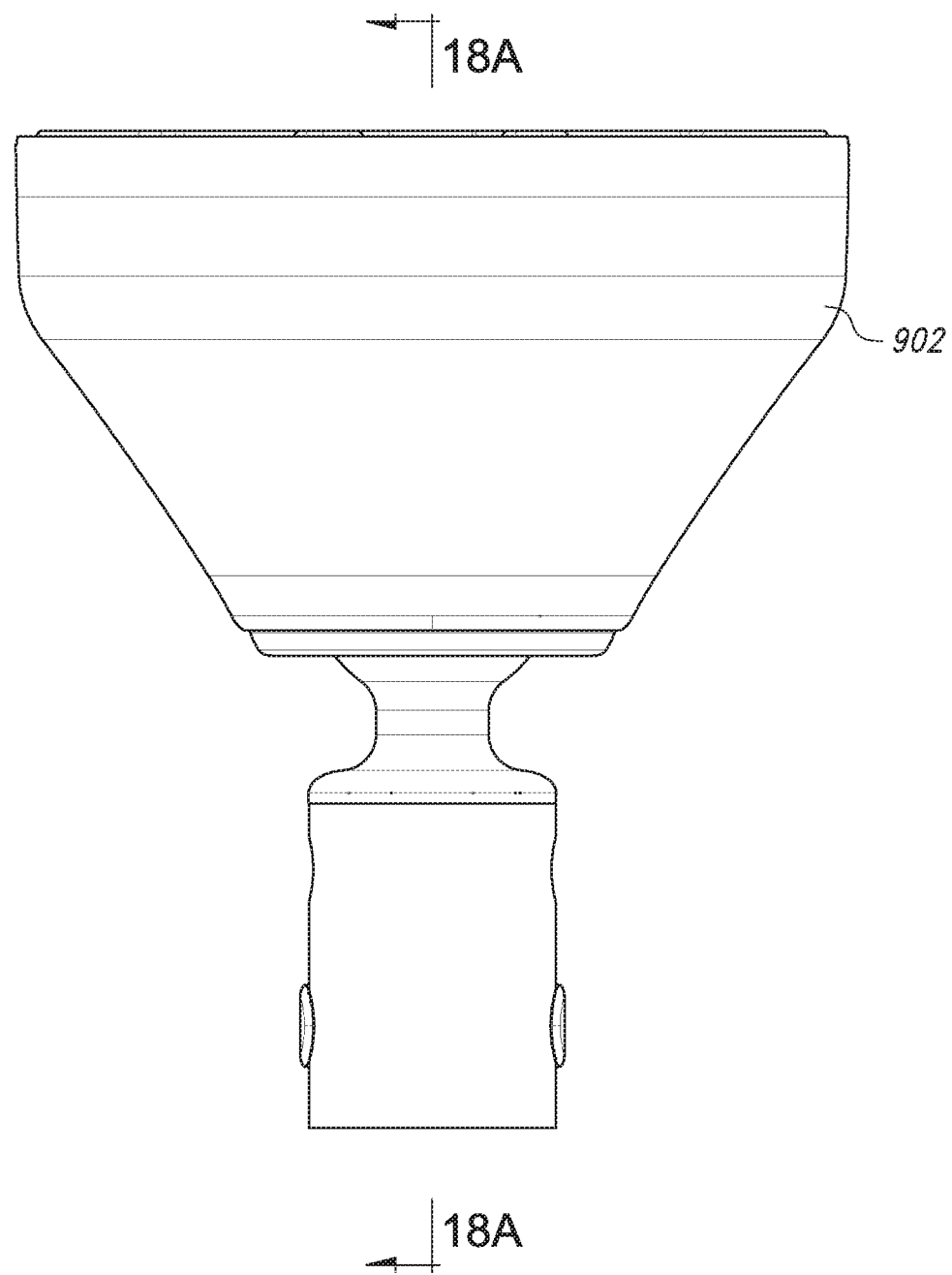
Figure 18A:
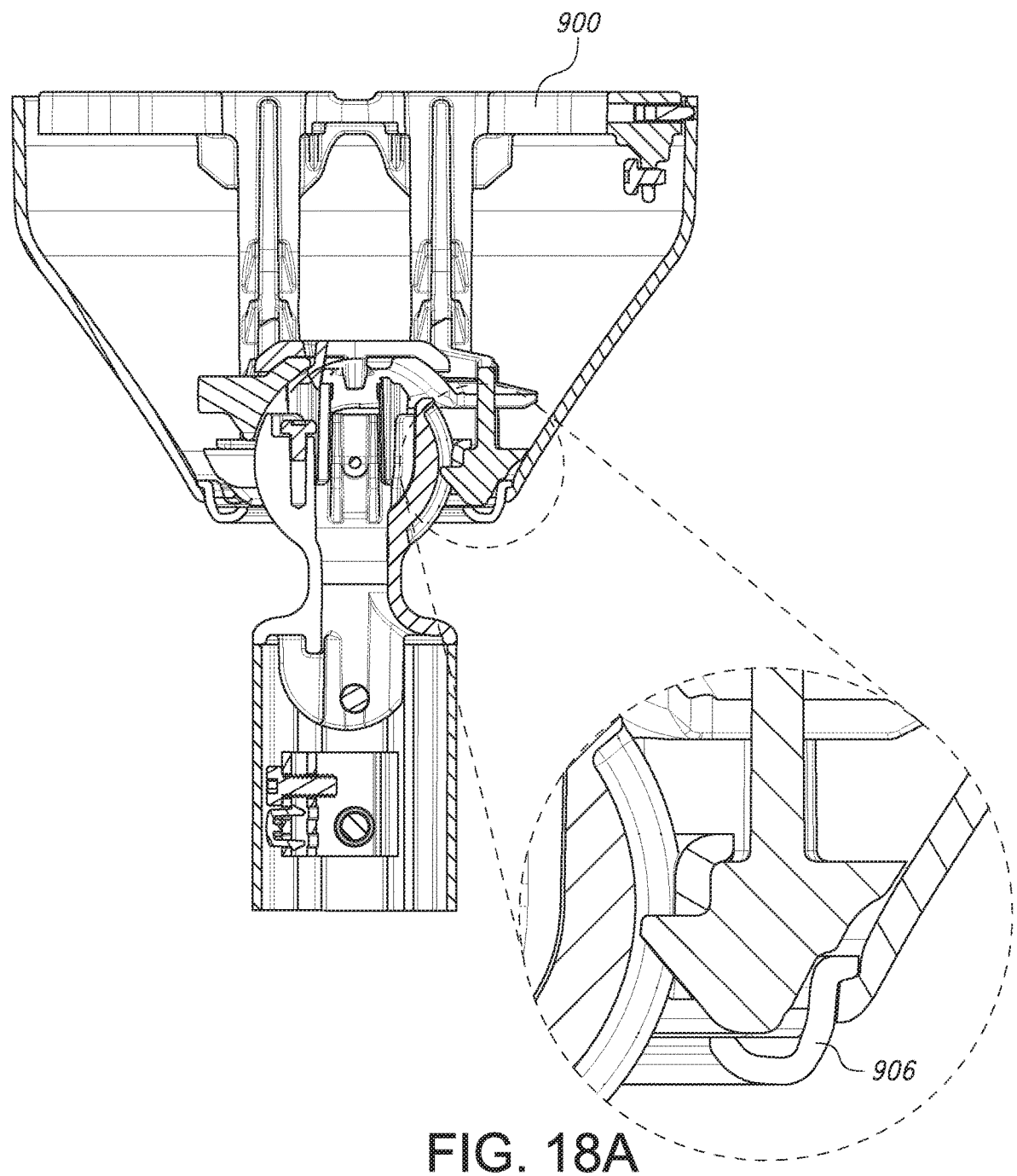
Figure 19:
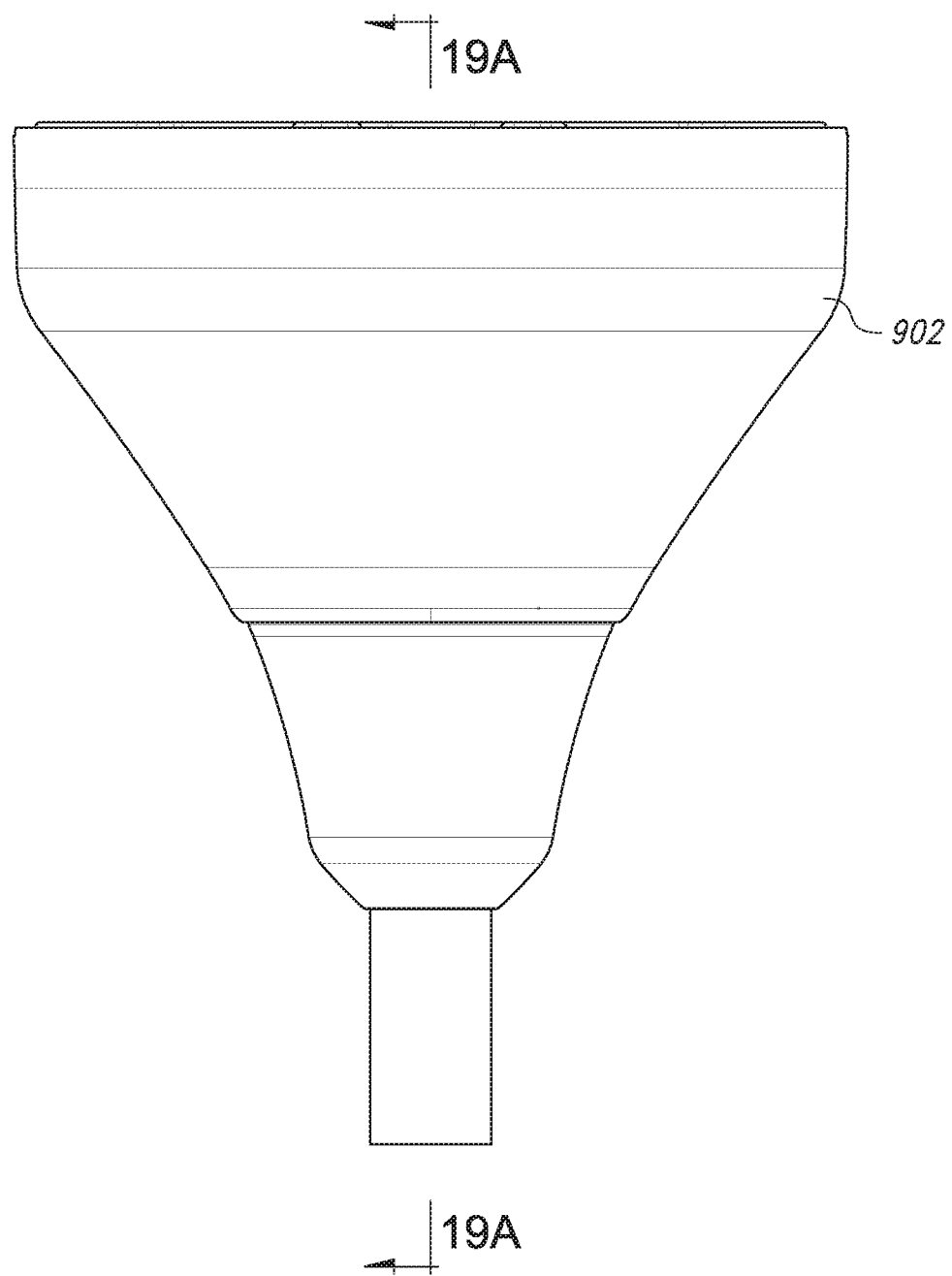
Figure 19A:
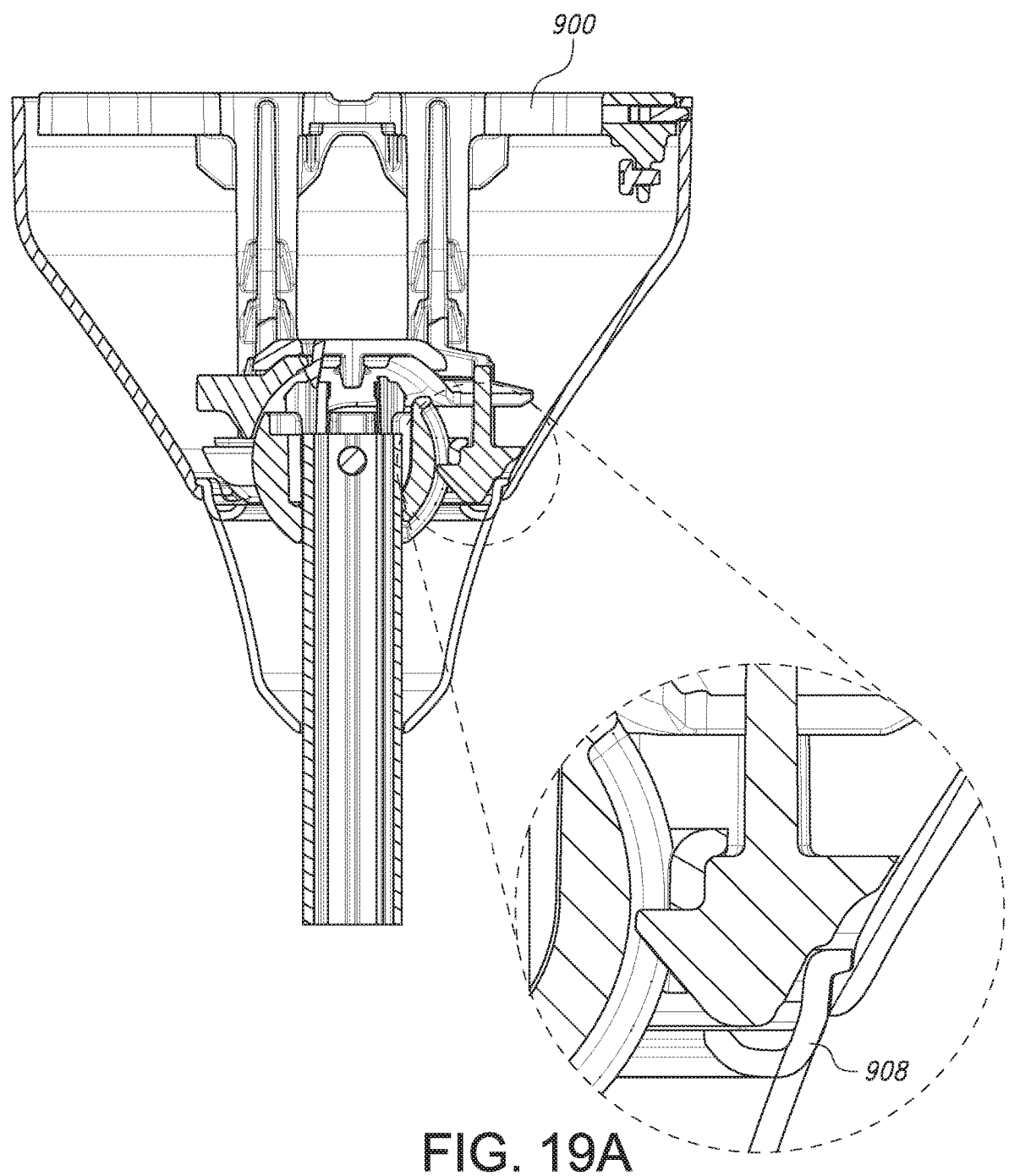

As can be seen in FIGS. 17, 18, and 19, a single cover 902 and a single mount 900 may be adapted for use with three different configurations: a wide down rod (e.g. 45 mm diameter) on a flat ceiling, a sloped ceiling (that may be used with either a wide down rod or a narrow down rod (e.g. 22 mm diameter)), and a narrow down rod D on a flat ceiling. Different trim pieces 904, 906, 908, respectively, may be paired with the three different configurations. Each of the trim pieces 904, 906, 908 may be adapted to telescope relative to a central opening of the cover 902. Furthermore, the trim piece 906 for the sloped ceiling (note hourglass-shaped ball member) may be very short in the vertical direction and rounded so as to not interfere with the downrod receiver of the ball member when pivoted as a result of the angled position of mount 900 on a sloped ceiling. As can be appreciated, multiple trim pieces, such as pieces 904, 906, or 908, may be provided with the mount 900 and/or cover 902 in the form of a kit Each of the following terms written in singular grammatical form: "a", "an", and the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase "consisting essentially of." Each of the phrases "consisting of" and "consists of, as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, generally, etc., as used herein, refer to ±10% of the stated numerical value or as close as possible to a stated condition.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

The invention claimed is:

1. An apparatus for mounting a fan, comprising;
a fan mount for supporting the fan, the fan mount comprising a first part movable relative to a second part, wherein the first part comprises a partially spherical ball and the second part comprises a socket for at least partially receiving the partially spherical ball; and
a retainer connected to the second part of the fan mount above the first part, the retainer including a rounded lower surface for receiving the first part during movement of the first part relative to the second part.

2. The apparatus of claim 1, wherein the retainer positioned in the fan mount for receiving an upper surface of the partially spherical ball.

3. The apparatus of claim 2, wherein the socket comprises a plurality of radially extending projections for engaging the partially spherical ball.

4. The apparatus of claim 2, wherein the retainer includes at least one projection for extending into a receiver of the partially spherical ball.

5. The apparatus of claim 1, wherein the retainer includes at least one projection for connecting with a second part of the fan mount.

6. The apparatus of claim 5, wherein the at least one projection is adapted to form a snap fit engagement with the second part.

7. The apparatus of claim 1, wherein the rounded lower surface of the retainer is in the form of a hemisphere.

8. The apparatus of claim 1, wherein the retainer is adapted to act as a lid to retain the first part within the second part.

9. The apparatus of claim 5, wherein the at least one projection is a resilient tab.

10. The apparatus of claim 9, wherein the resilient tab is adapted to be compressed and then expanded into a locking engagement with the second part.

11. The apparatus of claim 5, wherein the at least one projection is one or more first tabs adapted to engage corresponding first receivers at a first location on the second part.

12. The apparatus of claim 11, wherein the at least one projection is one more second tabs adapted to engage corresponding second receivers at a second location on the second part.

13. The apparatus of claim 1, wherein the first part is associated with a support.

14. The apparatus of claim 13, wherein the mount is adapted to permit the support and the fan to pivot about at least two axes that are perpendicular to a longitudinal axis defined by the support.

15. The apparatus of claim 1, wherein the first part includes a slot adapted to mate with a tab of the second part to allow for pivoting of the fan.

16. An apparatus for mounting a fan, comprising;
a fan mount for supporting the fan, the fan mount comprising a first part movable relative to a second part; and
a retainer connected to the second part of the fan mount above the first part for restricting movement of the fan relative to the fan mount, wherein the retainer includes at least one opening, and further including a restrictor having a projection for passing through the at least one opening for engaging the first part of the fan mount.

17. The apparatus of claim 16, wherein the restrictor is adapted to form a releasable locking engagement with the retainer.

\* \* \* \* \*